Sept. 1, 1964 K. HEISE 3,146,941
COMBINED TYPEWRITER AND CALCULATOR
Filed March 16, 1959 19 Sheets-Sheet 1

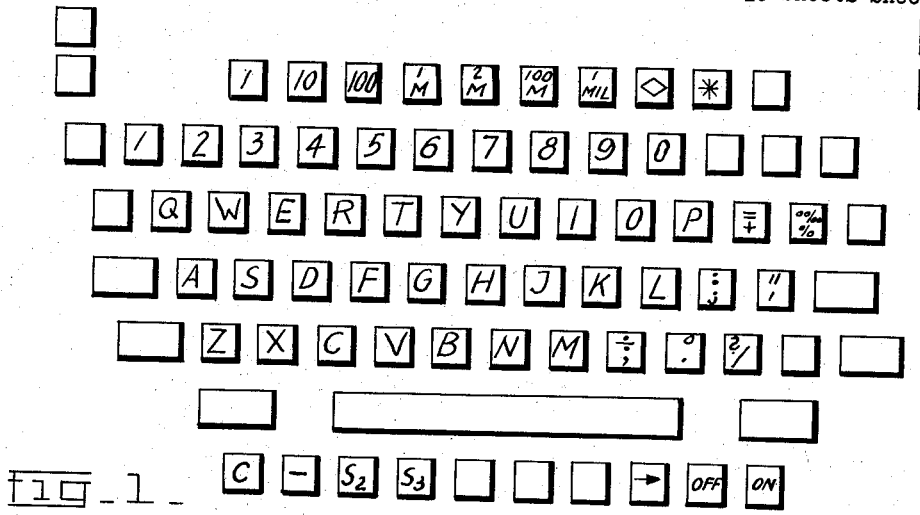

fig_1_

ABC TRADING CO.
INVOICE

TO: MR. JOHN Q. DOE
ADDRESS: 1504 LIBERTY ST.
CITY: OAKLAND 10
STATE: CALIF.

DATE AUG. 21, 1958

| NUMBER OF ITEMS | UNIT PRICE $ | DESCRIPTION | TOTAL OF ORDER | TOTAL OF INVOICE |
|---|---|---|---|---|
| 253 PCS | 13.00 | YOUR ORDER #423 | $ 3289.00* | |
| 2 TON | 25.32 | YOUR ORDER #429 | 50.64 | |
| .05 TON | 75.50 | YOUR ORDER #472 | 37.75 | |
| .125 TON | 21.00 | YOUR ORDER #501 | 2.63 | |
| | | | $ 3380.02 | |
| | PLUS 2.5% | SALES TAX | 84.50 | |
| | | | $ 3464.52 | $ 3464.52 |

TERMS: 30 DAYS CASH

* ACCORDING TO VERBAL AGREEMENT
CAT. NO. 342-AS-7002 SUBSTITUTED FOR CAT. NO. 342-AS-7003 fig_2_

INVENTOR: KURT HEISE
BY: *Clarence W. Martin*
AGENT

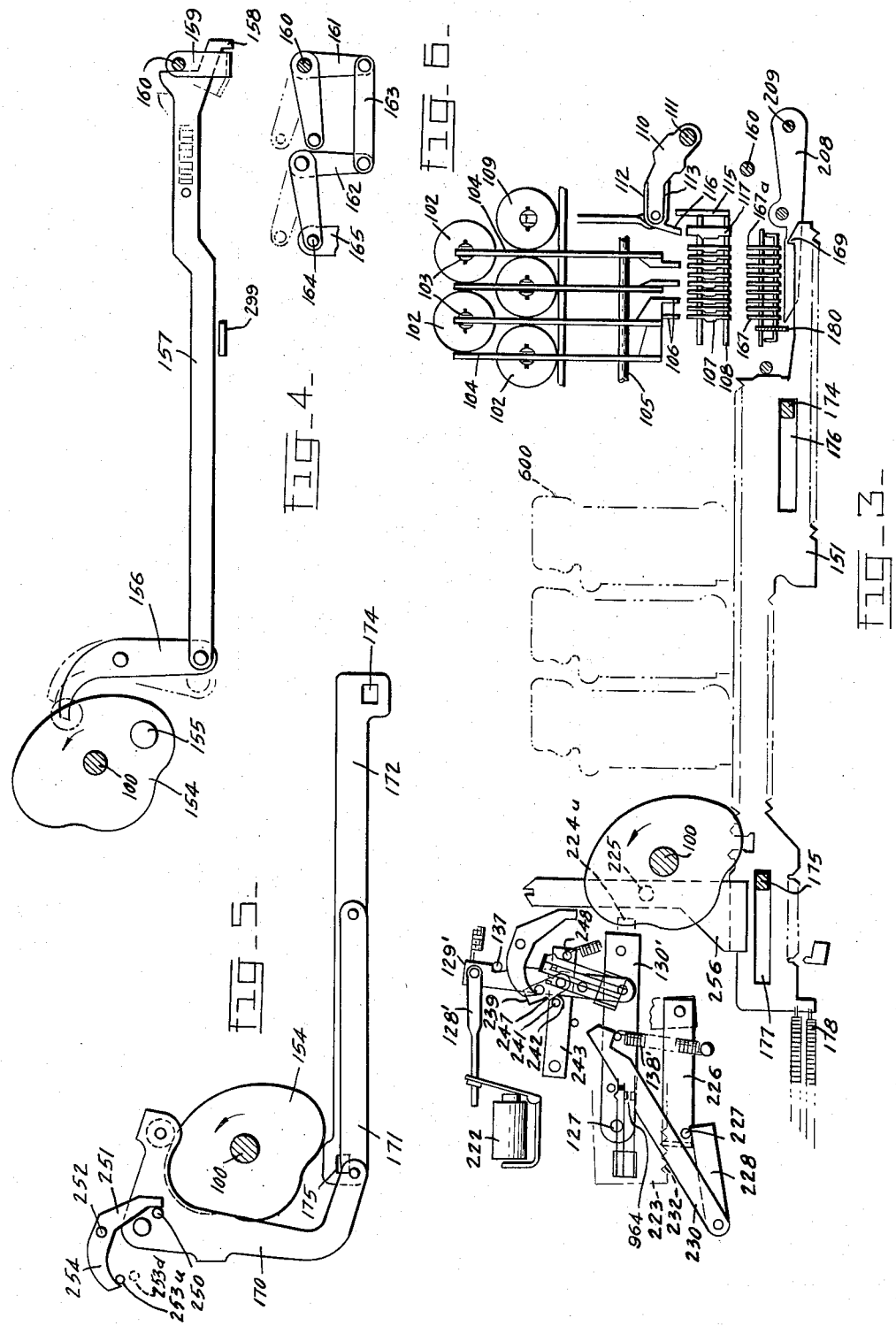

Sept. 1, 1964  K. HEISE  3,146,941
COMBINED TYPEWRITER AND CALCULATOR
Filed March 16, 1959  19 Sheets-Sheet 3
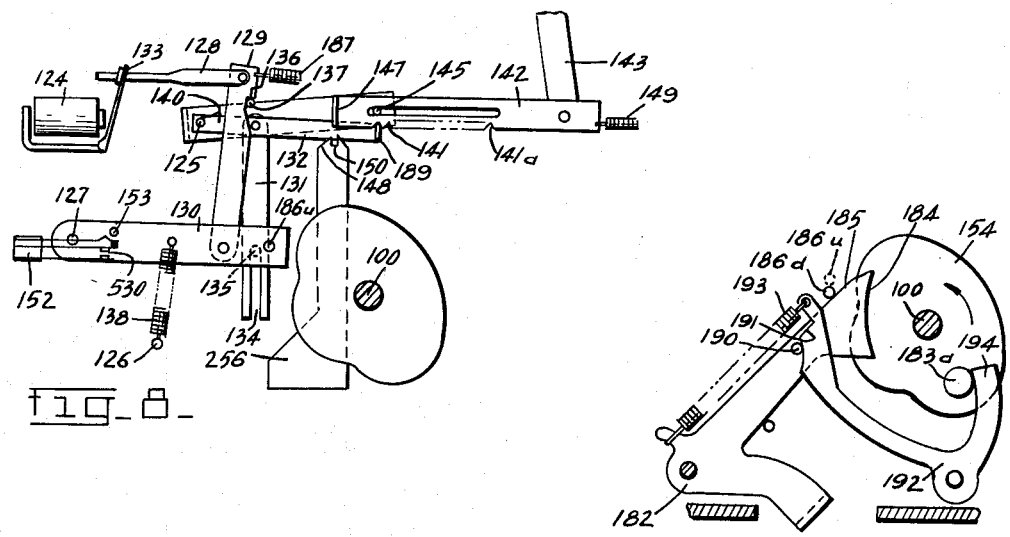
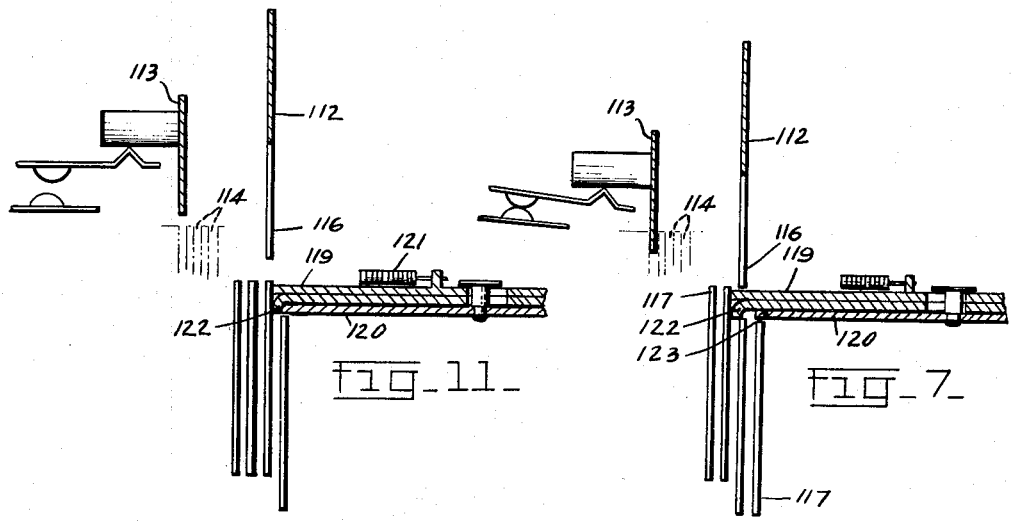
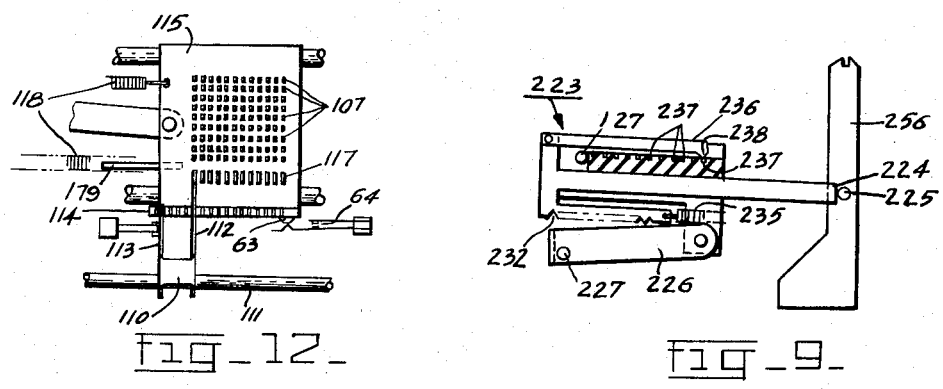

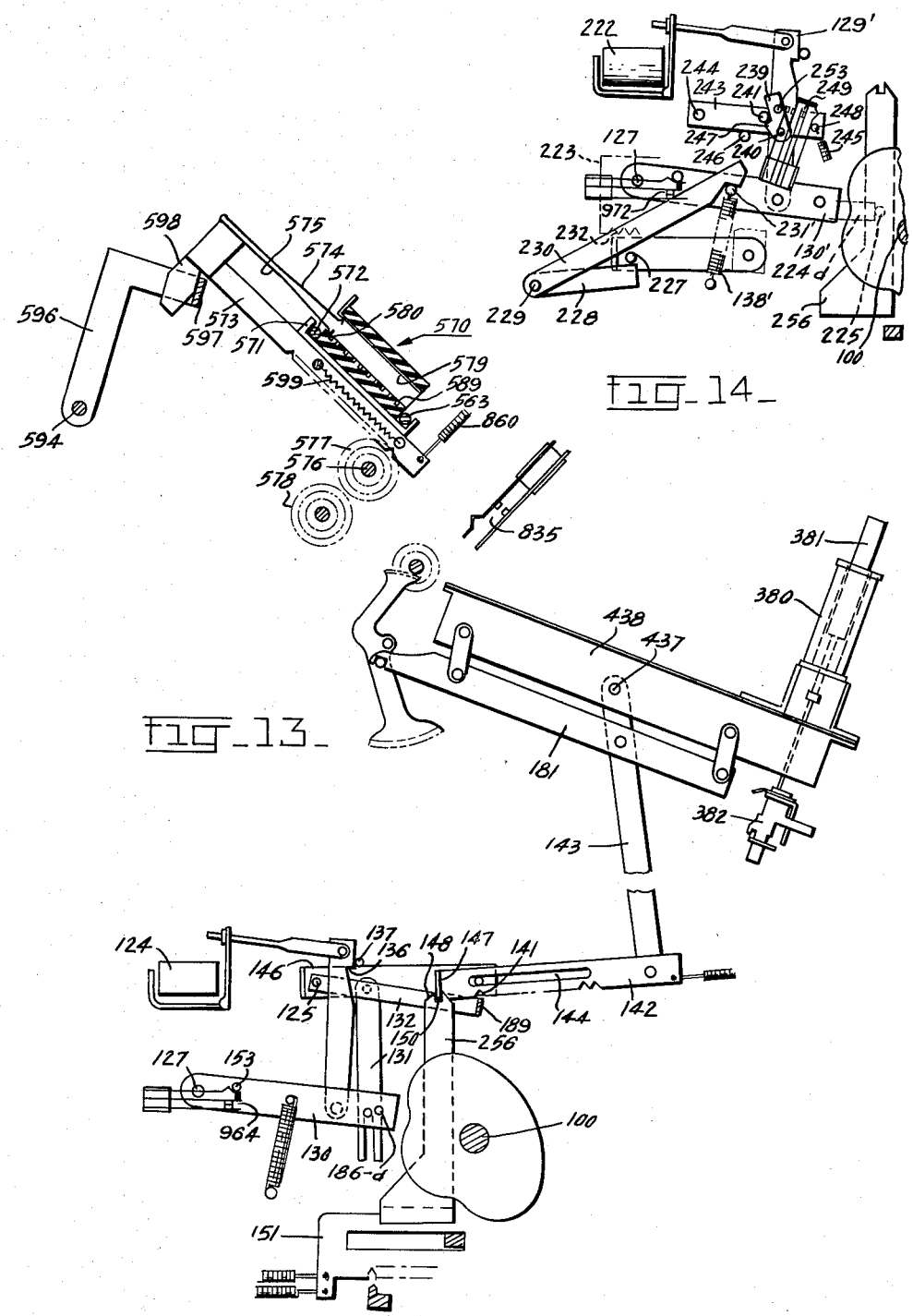

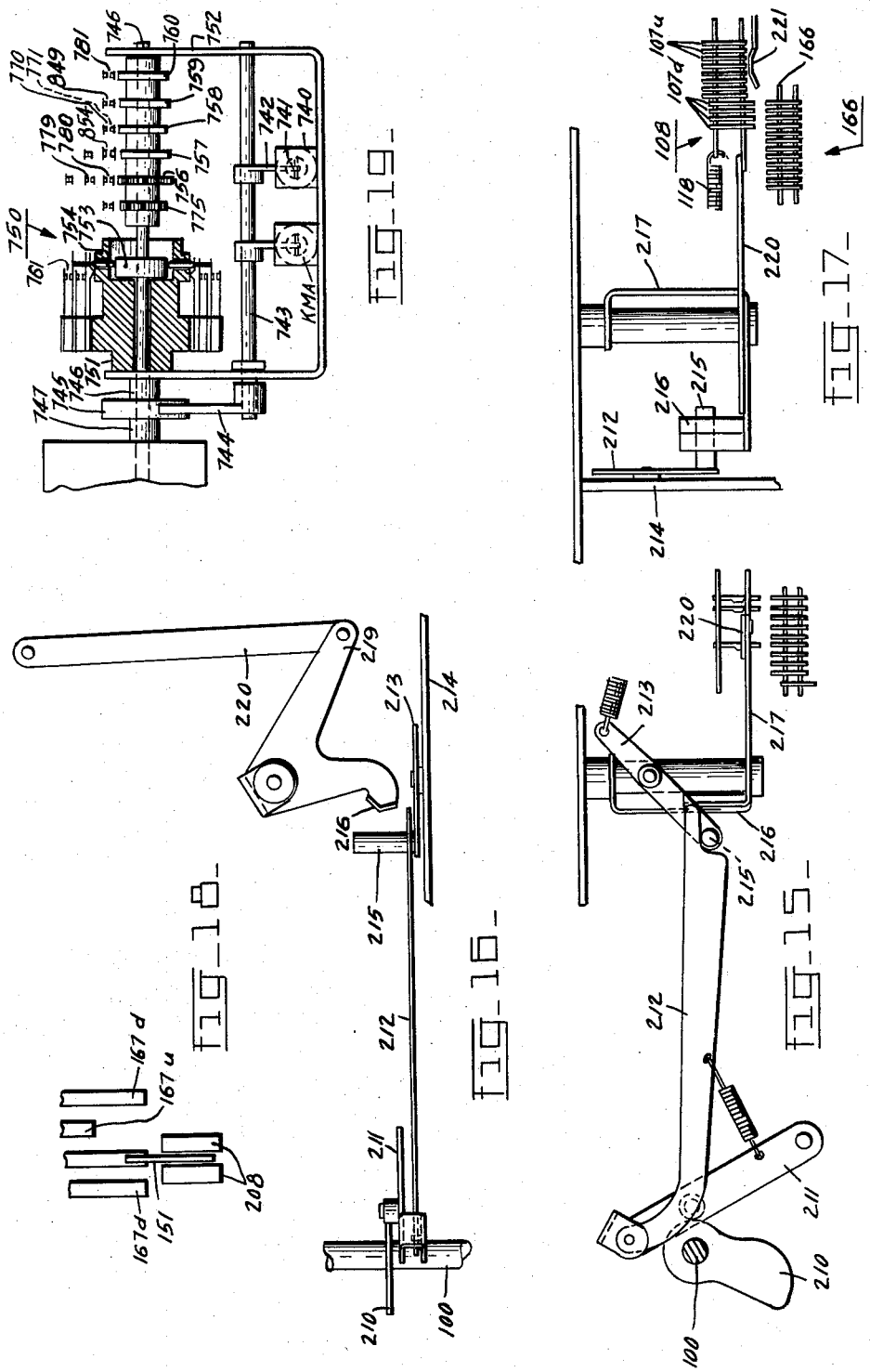

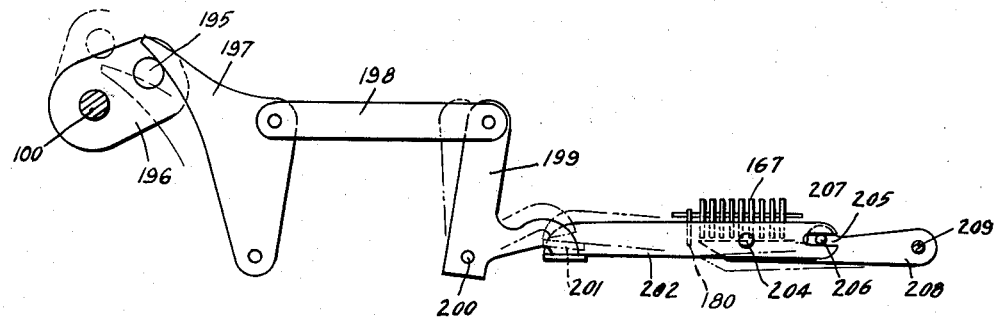
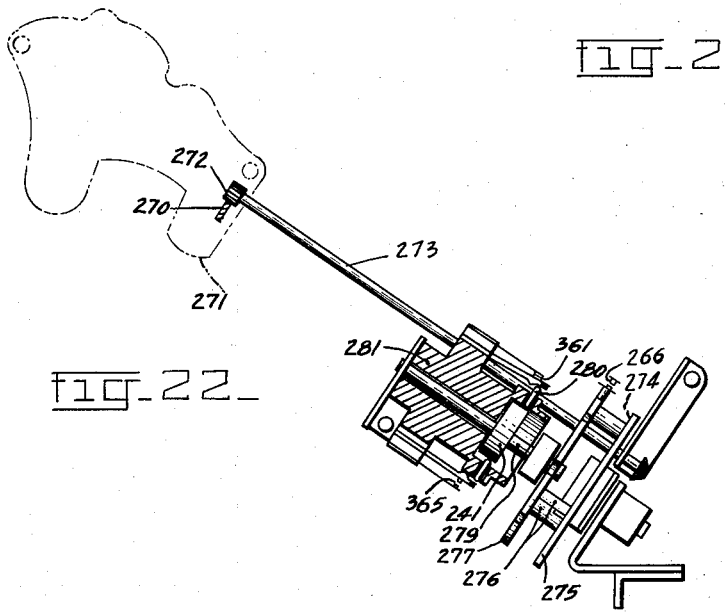
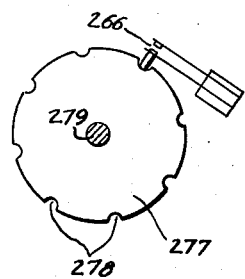
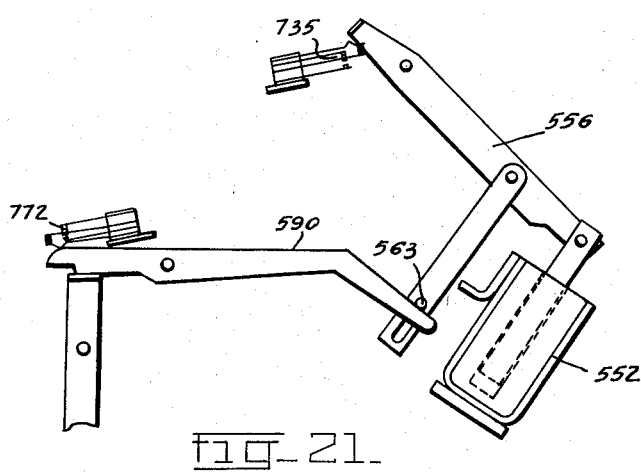

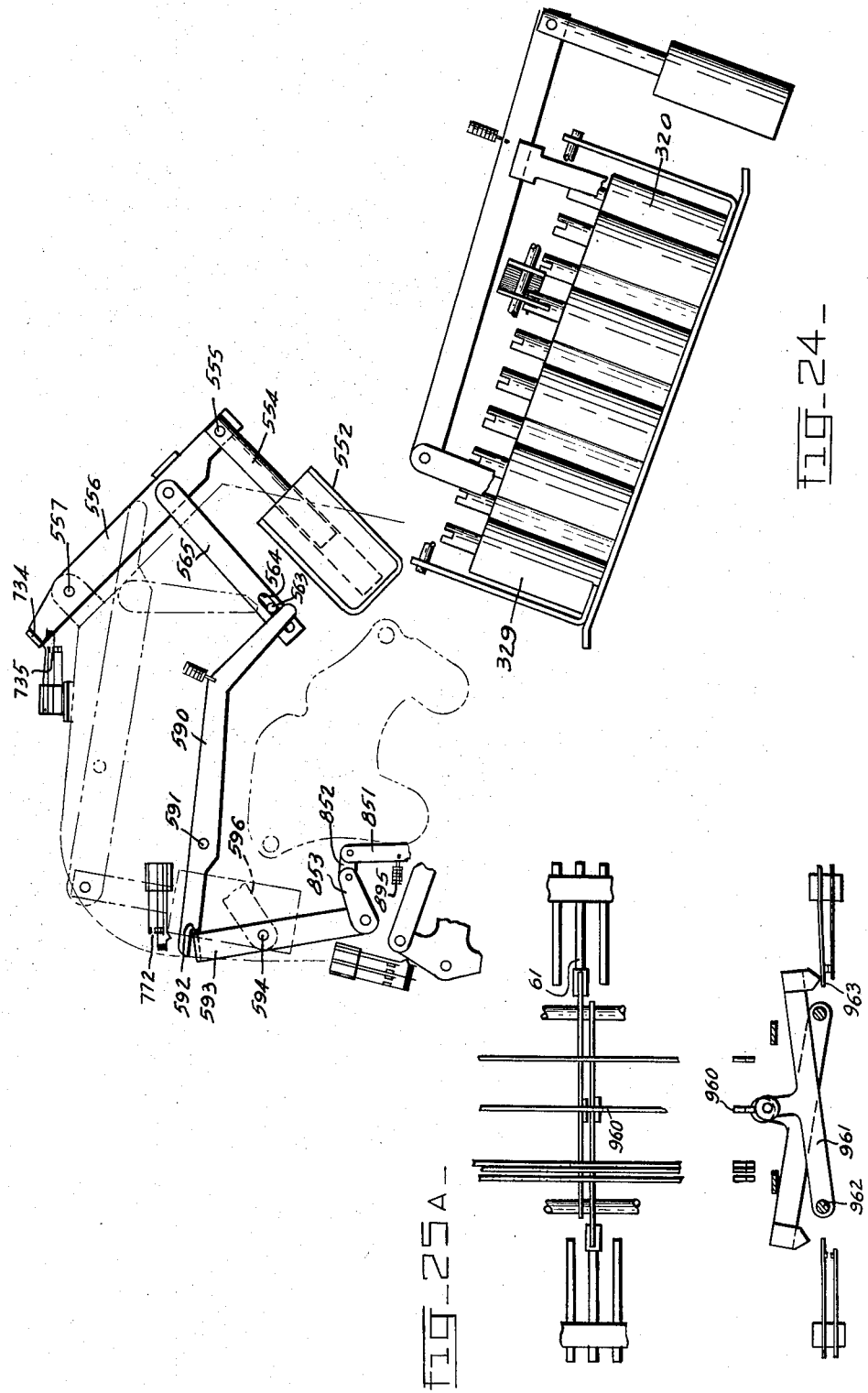

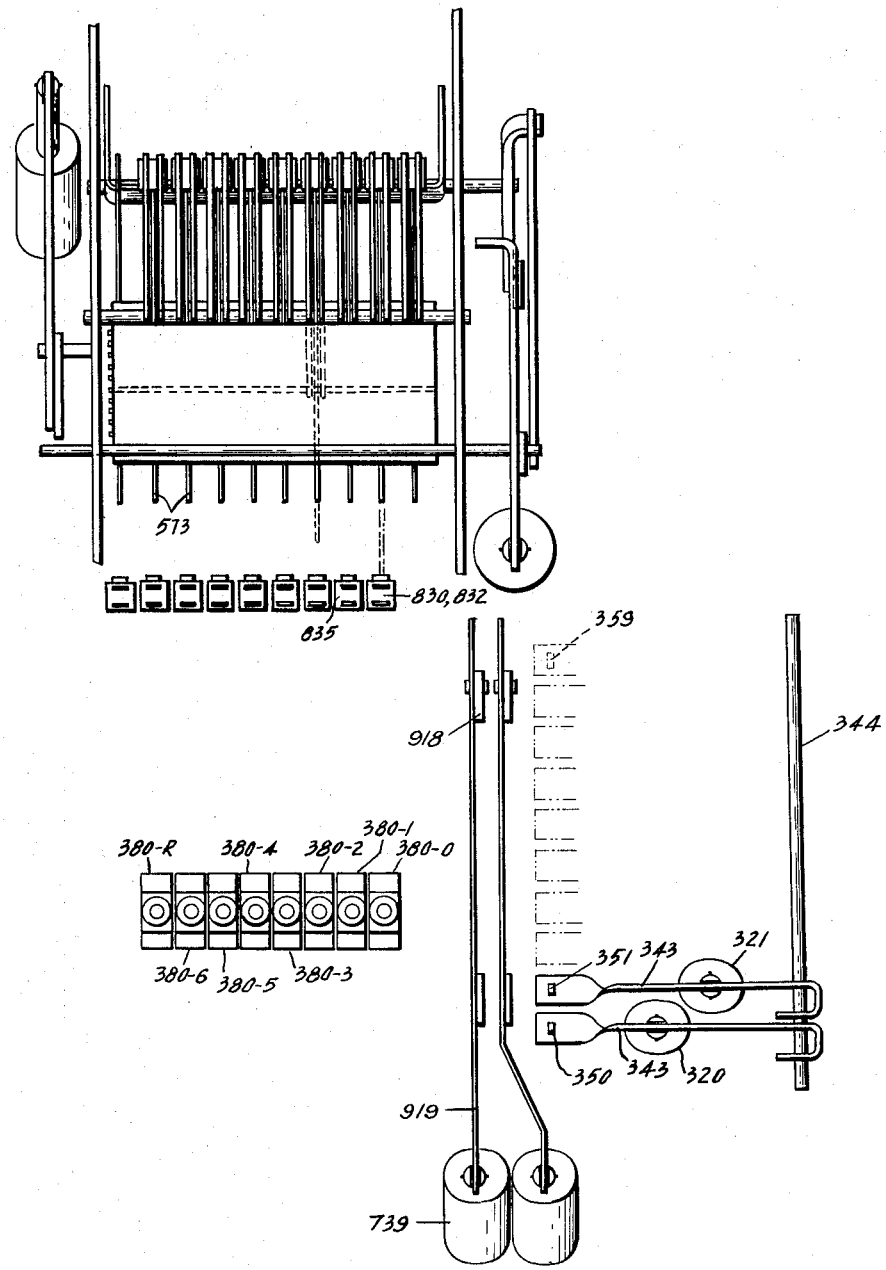
fig_24A_

Sept. 1, 1964 K. HEISE 3,146,941
COMBINED TYPEWRITER AND CALCULATOR
Filed March 16, 1959 19 Sheets-Sheet 9

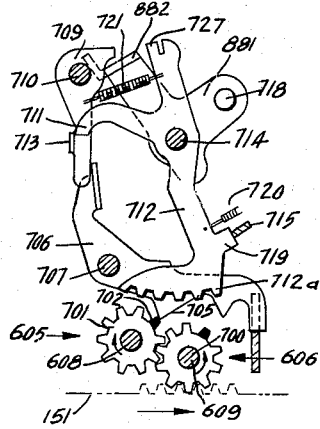
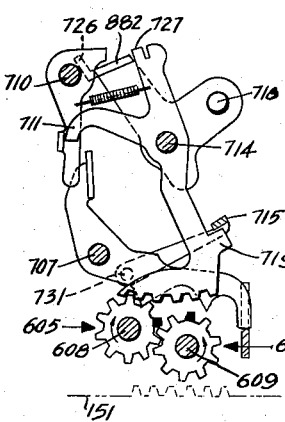
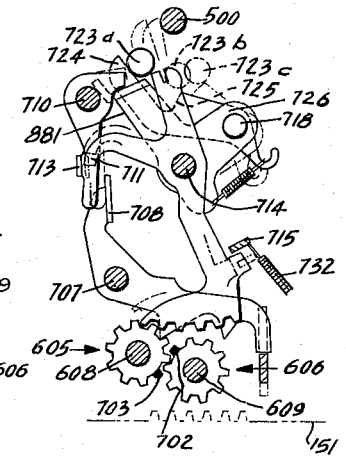
fig_39_   fig_40_   fig_41_
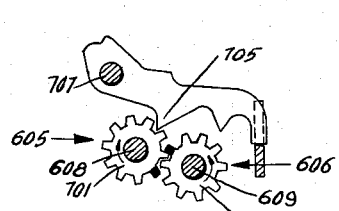
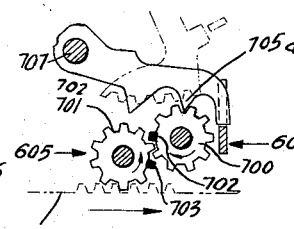
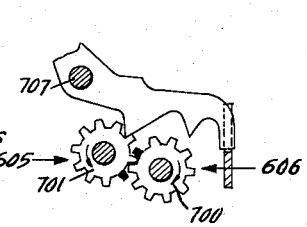
fig_42_   fig_43_   fig_44_
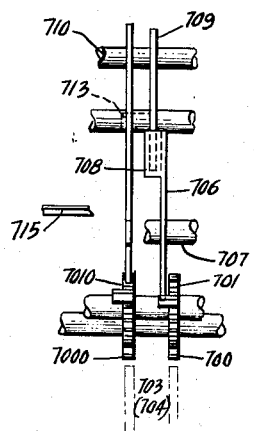
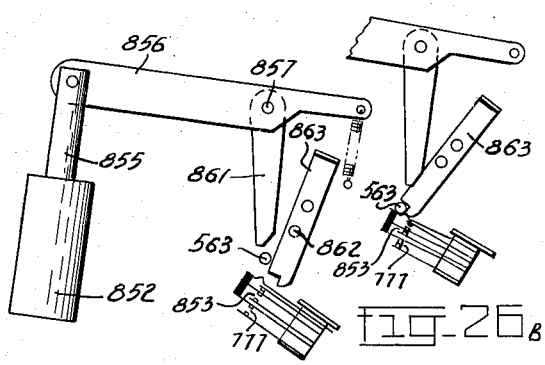
fig_45_   fig_26A_

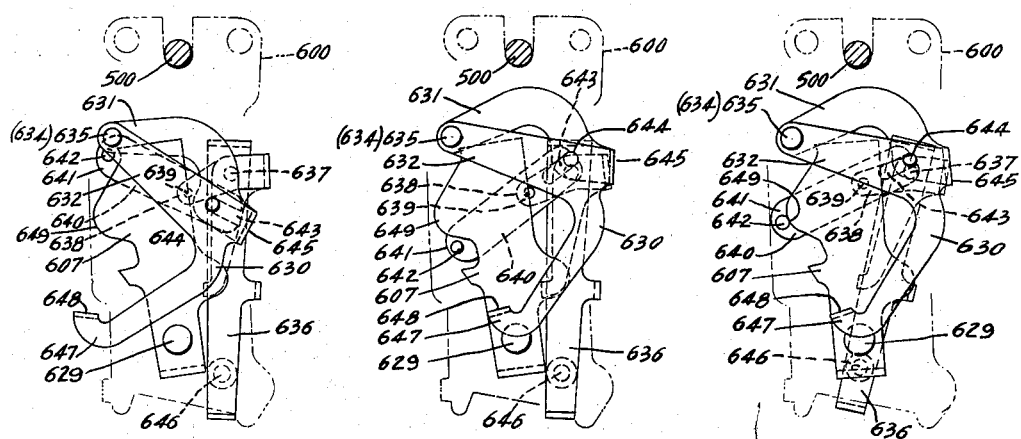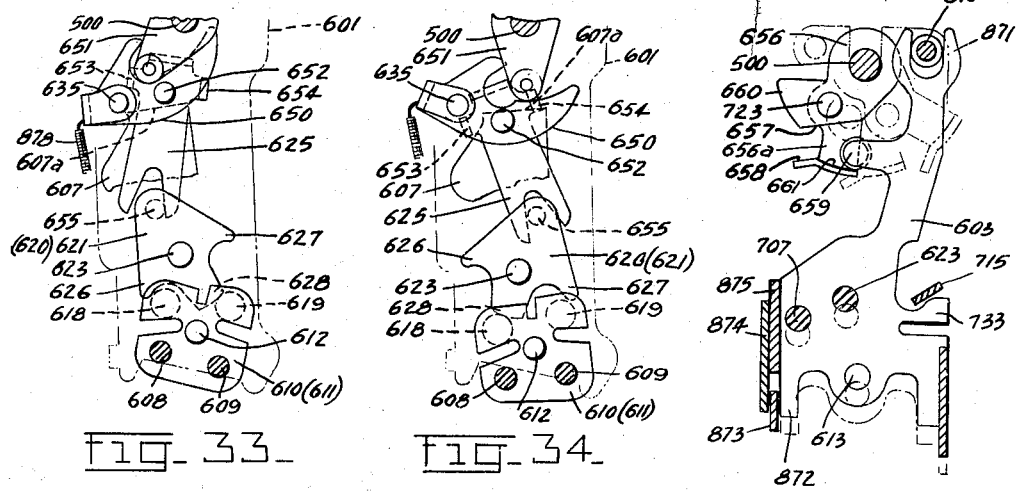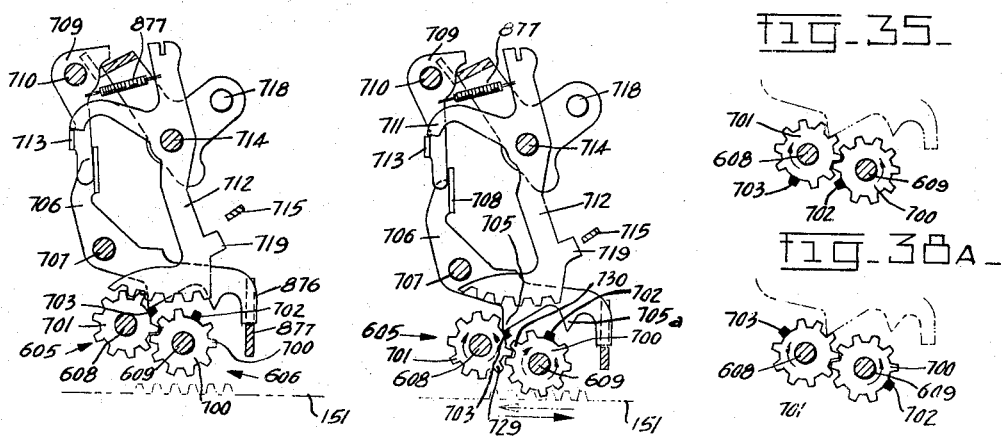

Sept. 1, 1964 K. HEISE 3,146,941
COMBINED TYPEWRITER AND CALCULATOR
Filed March 16, 1959 19 Sheets-Sheet 14
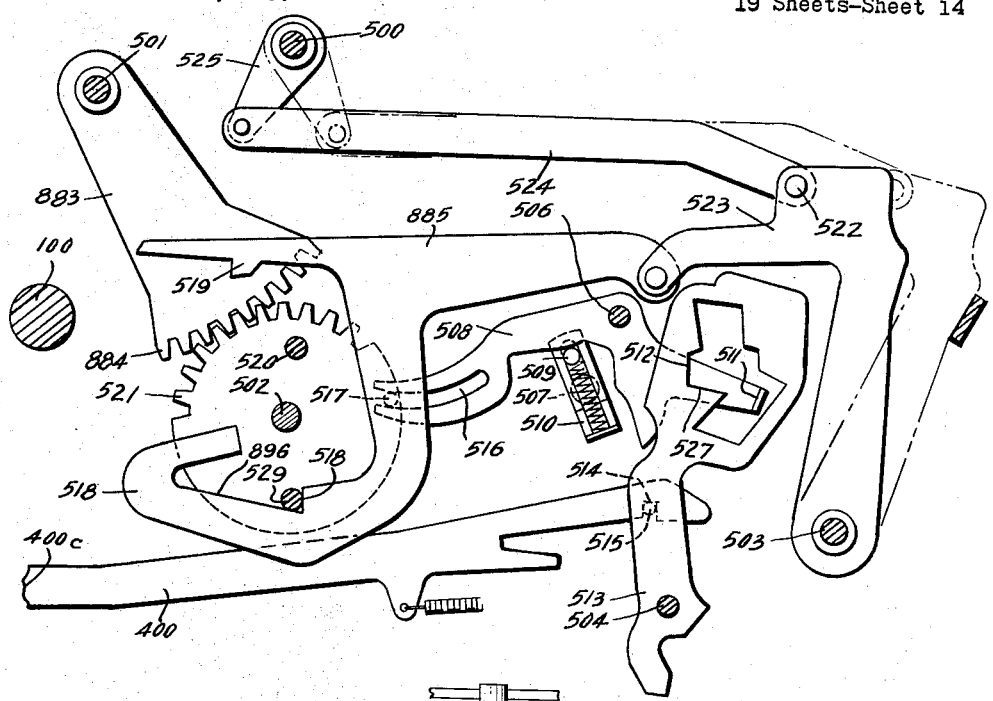
fig-48-
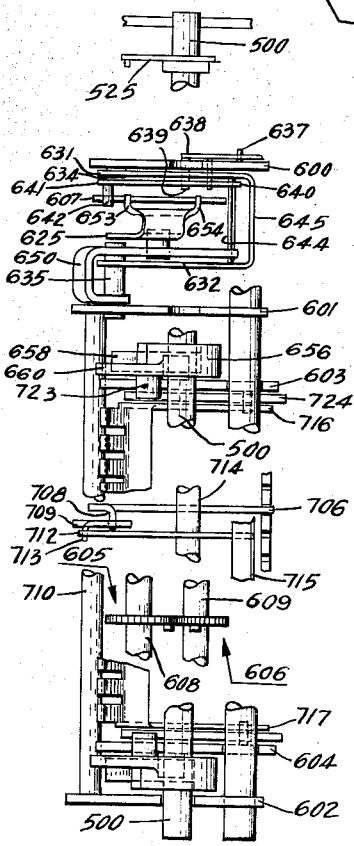
fig-49-

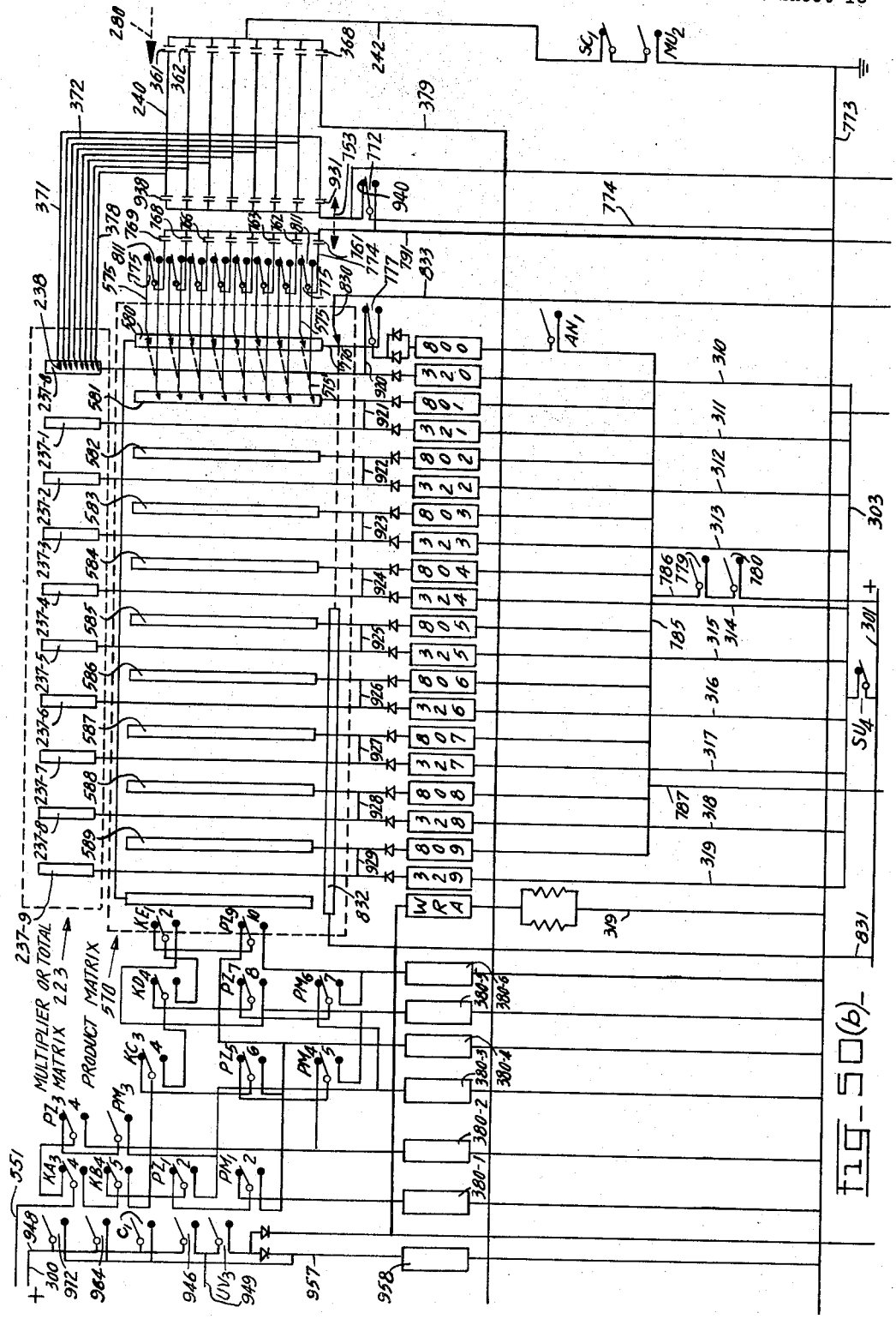

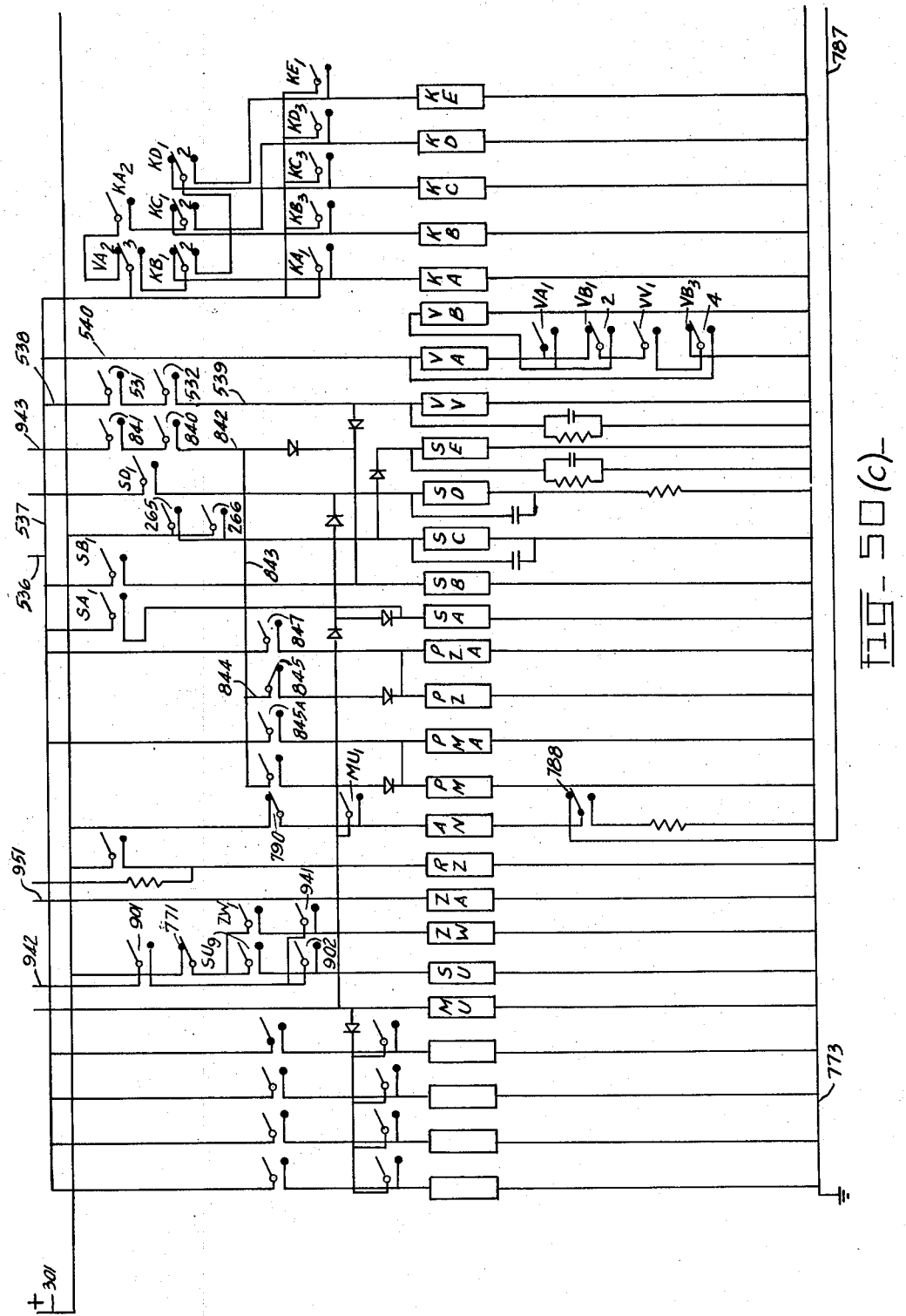

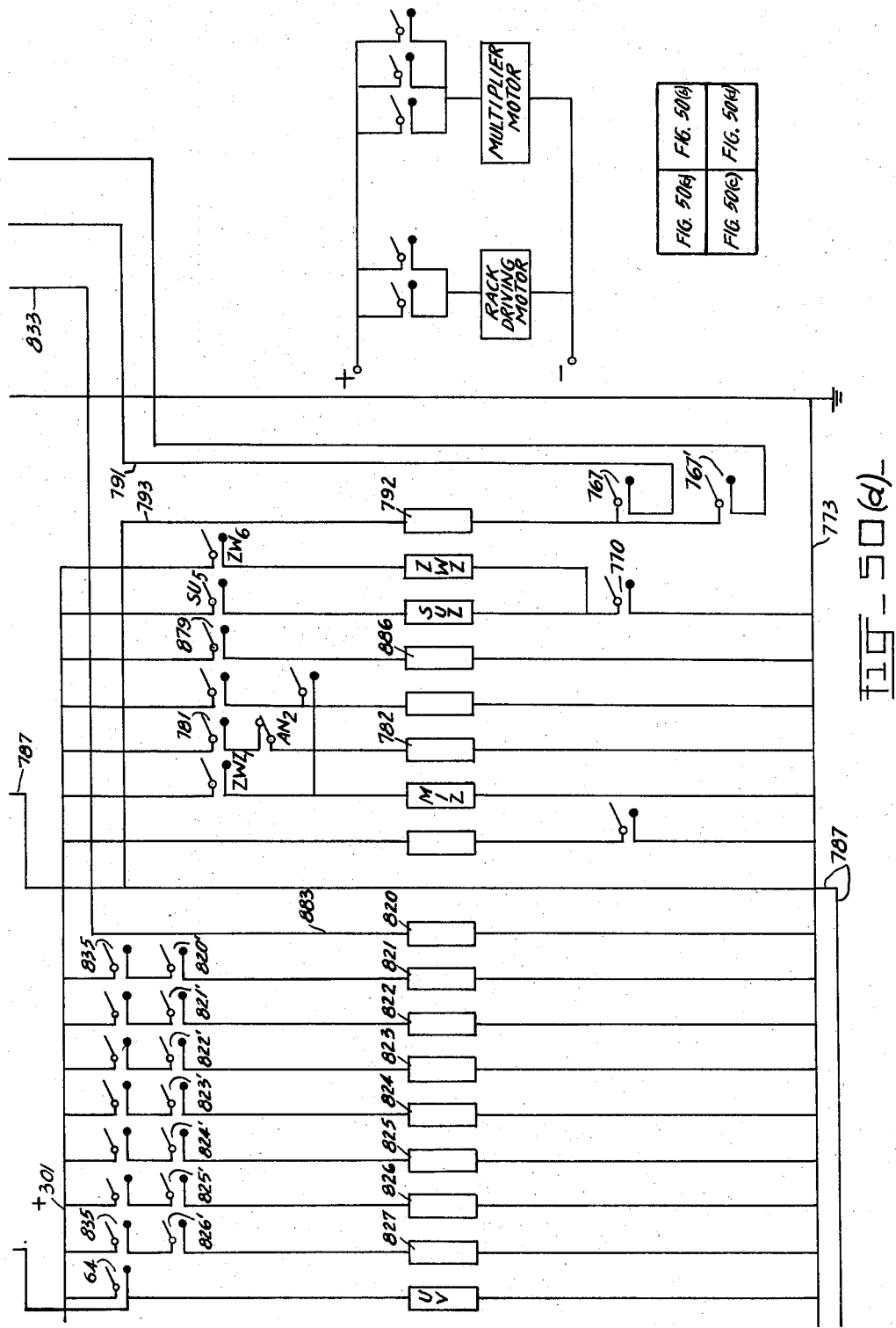

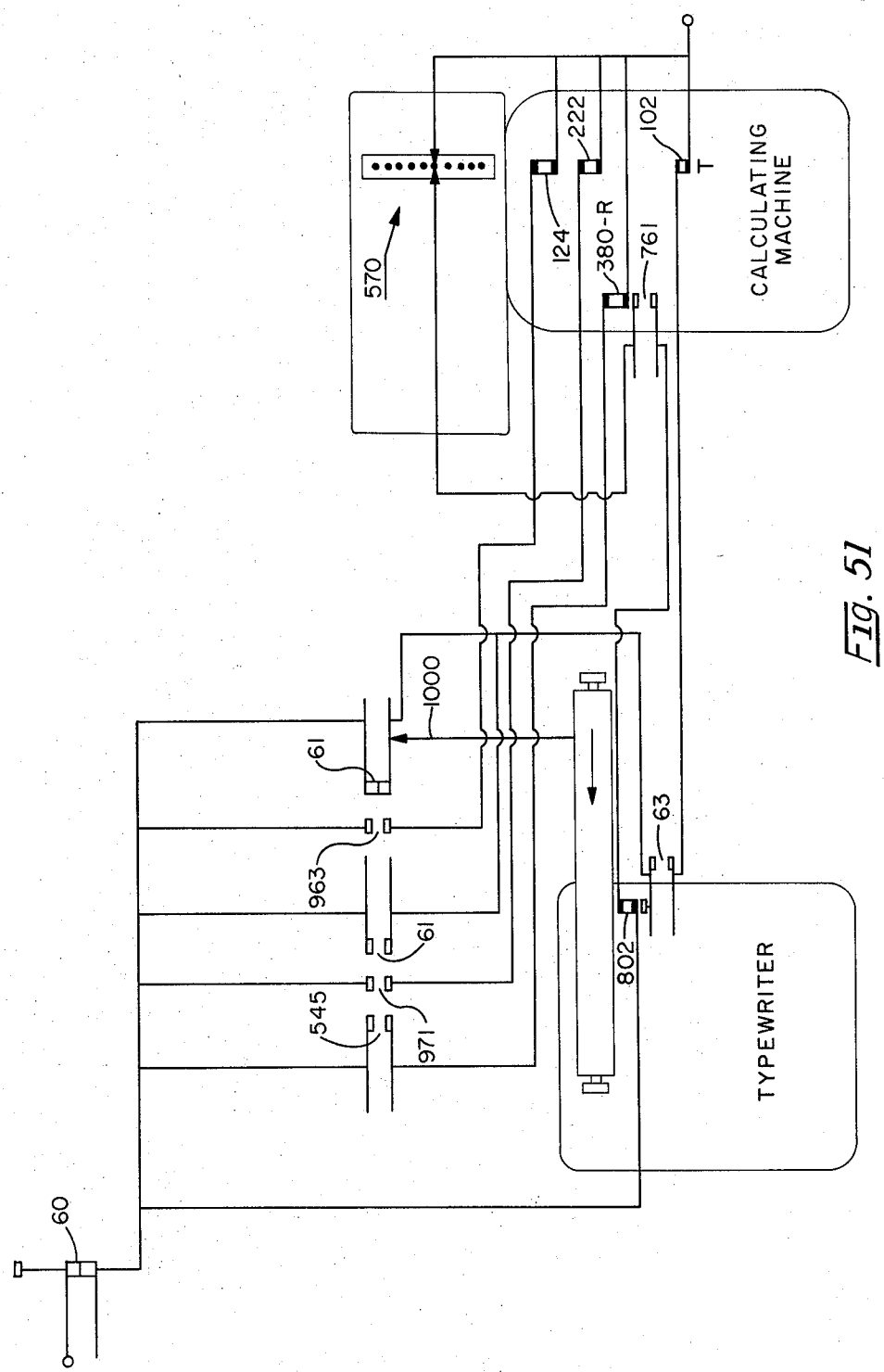

United States Patent Office 3,146,941
Patented Sept. 1, 1964

3,146,941
COMBINED TYPEWRITER AND CALCULATOR
Kurt Heise, Hamburg-Billstedt, Germany, assignor to SCM Corporation, a corporation of New York
Filed Mar. 16, 1959, Ser. No. 799,715
6 Claims. (Cl. 235—60.12)

The invention relates to a combined typewriter and calculator whereby values are entered into the calculator as respective factors during the typing of the price and number of items on an invoice. A calculation is then initiated and the product of the two factors is automatically typed out under the control of a read-out mechanism. More specifically, the invention concerns means for aligning the decimal point of a value in the product register with a decimal point in the read-out mechanism.

Combined typewriters and calculators are known in which the read-out mechanism is permanently associated with a given number of orders of the result register and therefore the typing of the result with a decimal point located in a fixed position presents no particular problem. This arrangement, however, requires that the number of decimal places in each of the two factors of a calculation also be fixed. Thus, the arrangement becomes flexible with the result that the machine usually must be reprogrammed every time there is a change in the number of decimal places in either one of the factors or the result.

One alternative is to program the machine with a number of decimal places in each factor receiving mechanism which will take care of all probable decimal factors which may be entered. This arrangement, however, has two disadvantages, viz., (1) the greater the number of decimal places in the two factors, the greater the number of decimal places in the result register, thus effectively reducing the number of integral digits that may be printed, and (2) in those cases where the selected factor has a lesser number of decimal places than are provided in the factor receiving mechanism, zeros must be "pumped in" to complete the factor entry.

An object of the invention is to provide an improved combined typewriter and calculator.

Another object is to shift a register relative to a decimal point read-out mechanism.

Another object is to align a decimal point in a result register with the decimal point in a read-out mechanism.

A further object is to predetermine a tabulated position of decimal alignment of a register with a read-out mechanism, such tabulated position being controlled by a number of fractional digits in the factors of a calculation.

A still further object is to perform a progressive multiplication operation such as A X B X C and to properly located the decimal point of the final product ABC relative to the decimal point of the read-out mechanism.

According to the invention, two factors, which may be expressed as decimal values, are entered in a calculator simultaneously with the typing of the values on an invoice or other form. A decimal memory device counts the number of decimal digits that are contained in the two factors and accordingly determines the number of fractional digits that will be generated in the product of the two factors. At the end of the calculation the result register is shifted to a position in which the decimal point in the result register is aligned with a decimal point in the read-out device, regardless of how many fractional digits are in the product.

The decimal point in the read-out device may be set for reading out any selected number of decimal digits. When figuring in terms of United States currency, for example, one practice is to set the decimal point for reading dollars and cents, i.e., with two decimal orders. Thus, it is assumed that the result always will be expressed in dollars and cents; however, in some cases the value of an item may be expressed in terms of mills, and/or the number of items may be expressed in terms of one or more fractional digits. In either case, the total price for each item will be expressed in fractions of cents, but since the charges are not broken down to less than cents, the fractional digits are dropped or, some cases, rounded off to the nearest cent when the charges are printed on the invoice.

Assume now that the price per unit is expressed in mills as well as dollars and cents, for example, $1.375, and that the number of units is a fractional amount such as 62.5. Tn this case there is one extra fractional digit in each the price and the units, or a total of four fractional digits in the product. A machine according to the invention accounts for the extra fractional digits in the following manner.

A conditioning mechanism is provided on the typewriter carriage which is rendered operative by the typing of fractional digits to actuate a relay stepping mechanism once for each fractional digit that is entered. The stepping mechanism, in turn, controls a tabulator mechanism which determines the return shift of the calculator carriage. Since two fractional digits are considered "normal" for the present problem, the stepping mechanism is operated only when a total of two decimal digits have been entered in the two factors. For each decimal digit in excess of two, the tabulator mechanism is operated to cause tabulation of the carriage one order to the right of its initial letftmost position.

In the foregoing example of $1.375 x 62.5 = $5.9375, there are two decimal digits in excess of the normal two digits and therefore the carriage must be tabulated to a position which is two orders to the right of its initial position. This properly aligns the decimal point of the result in the register with the decimal point of the read-out mechanism.

In the embodiment shown, the register carriage is automatically returned to its position of decimal alignment with the read-out mechanism after a multiplying operation so that the machine is in proper condition to type out the result upon command.

In order that the invention may be practiced by others, it will be described in terms of an express embodiment, given by way of example only, and with reference to the accompanying drawings in which:

FIG. 1 shows the typewriter keyboard;
FIG. 2 shows a sample invoice;
FIG. 3 shows a left-hand view of the typewriter-controlled magnets, the escaping pin carriage, the rising pin carriage, the value racks, and other mechanisms;
FIGS. 4, 5, and 6 show a left-side view of mechanisms actuated by the main operator shaft;
FIGS. 7 and 11 show a top view of the pin carriage escape mechanism;
FIG. 8 shows a left-side view of the multiplicand entry mechanism;
FIG. 9 shows a left-side view of the multiplier storage mechanism;
FIG. 10 shows a partial left-side view of the restoring mechanism;
FIG. 12 shows a top view of the escaping pin carriage;
FIG. 13 shows a section through the multiplicand mechanism and the product read-out mechanism;
FIG. 14 shows a left-side view of the multiplier entry mechanism;
FIGS. 15, 16, and 17 show the pin carriage controls from front, above, and left;
FIG. 18 shows certain controls of the rising pin carriage;
FIG. 19 shows the product scanner mechanism from the left;

FIG. 20 shows the clear mechanism of the rising pin carriage;

FIG. 21 shows a left-side view of the product read-out magnet and related mechanisms;

FIG. 22 shows a left-side view of the multiplier scanner;

FIG. 23 shows a front view of the multiplier contact;

FIG. 24 shows a left-side view of the multiplier magnets and the product read-out magnet;

FIG. 24a shows a top view of the product storage mechanism, the half-cent round-out contacts, the multiplier magnets, and the product clear magnet;

FIGS. 25 and 25a show a top, resp. front, view of the programming unit in the typewriter;

Figure 27:
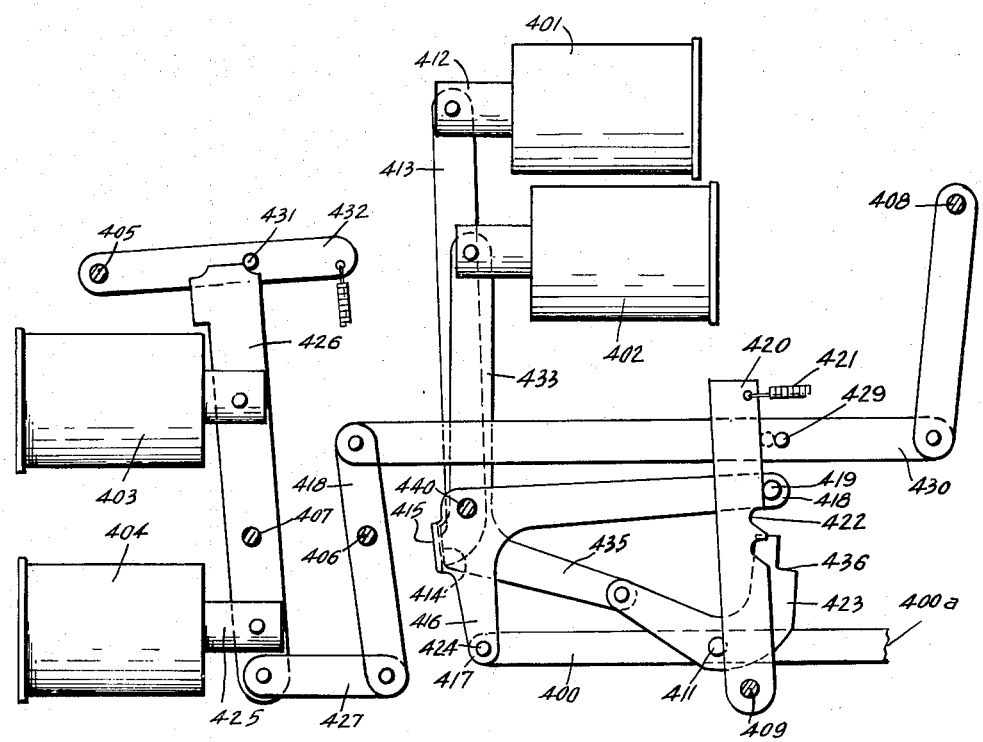
Figure 28:
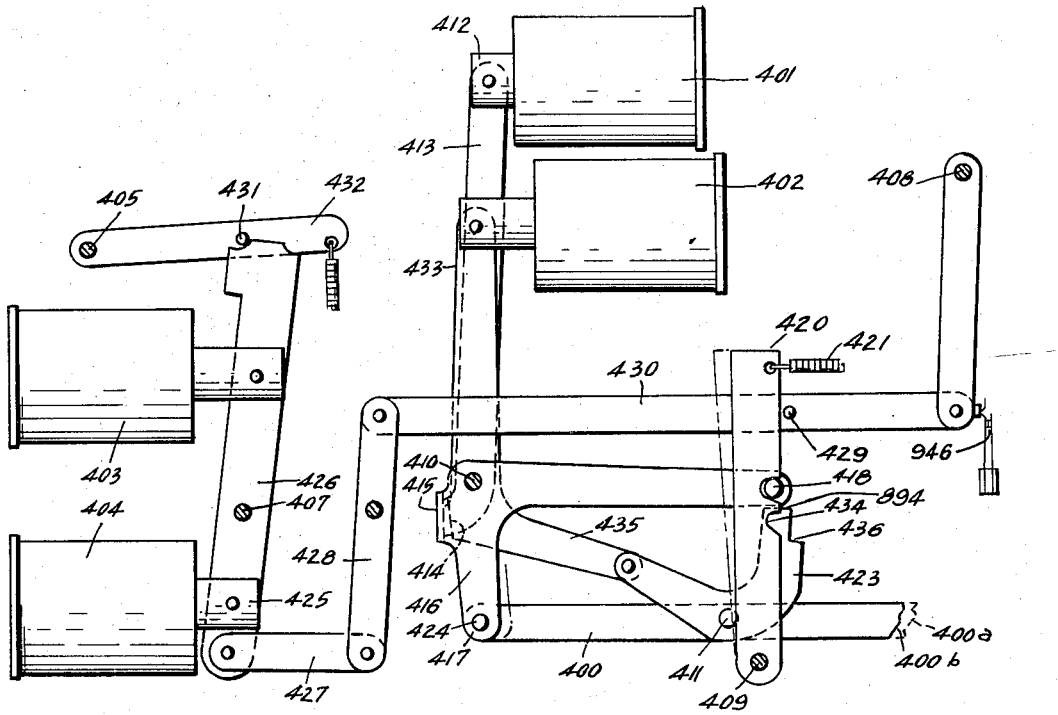
Figure 29:
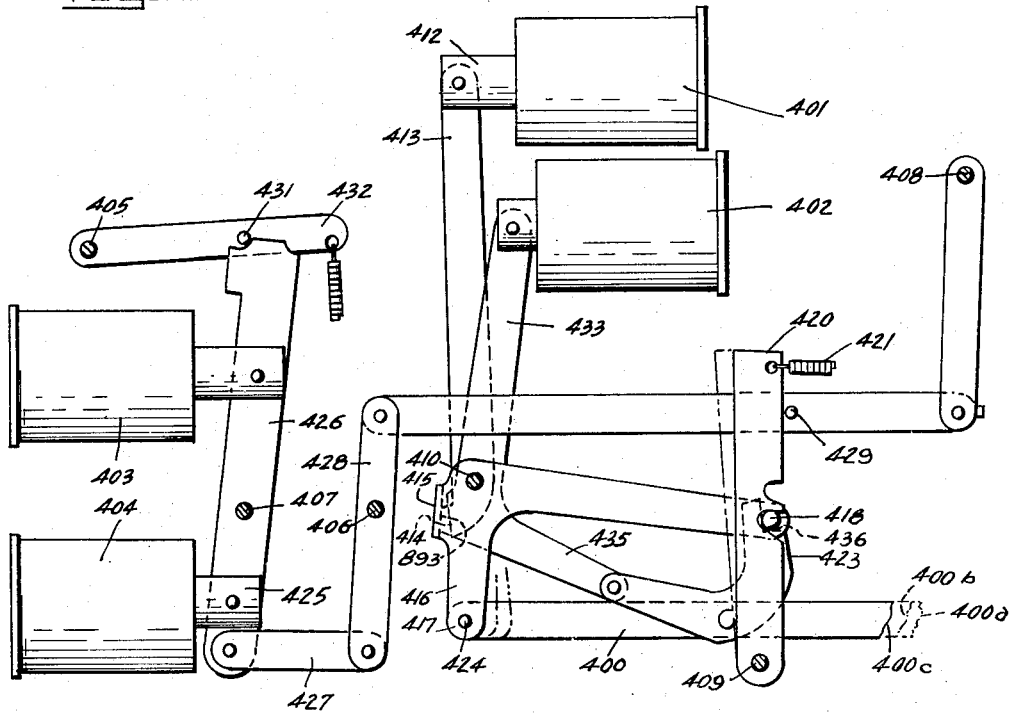
Figure 46:
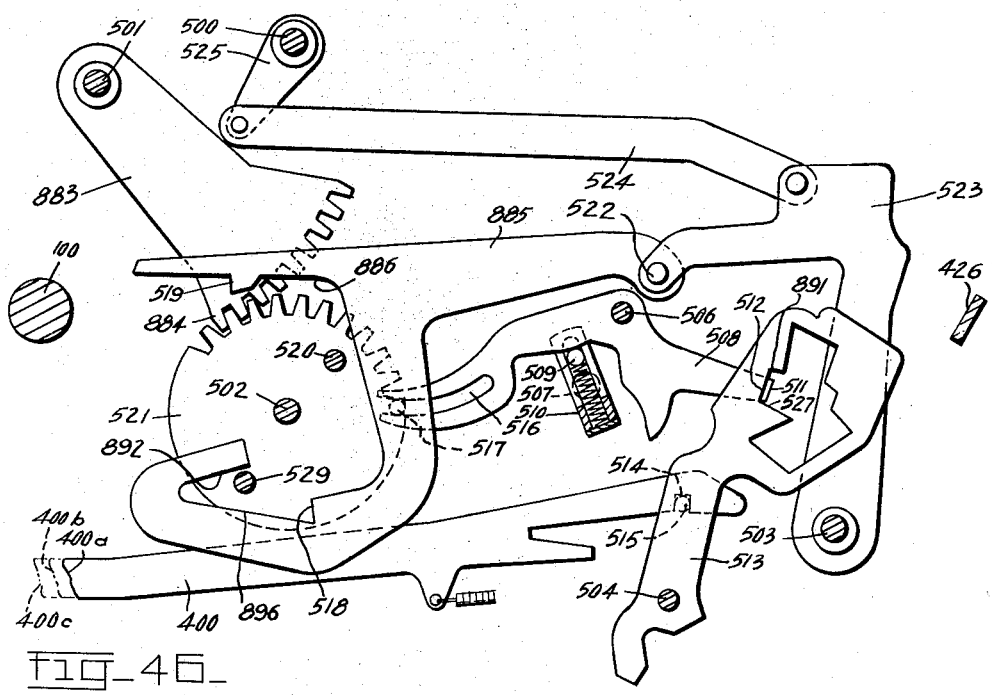
Figure 47:
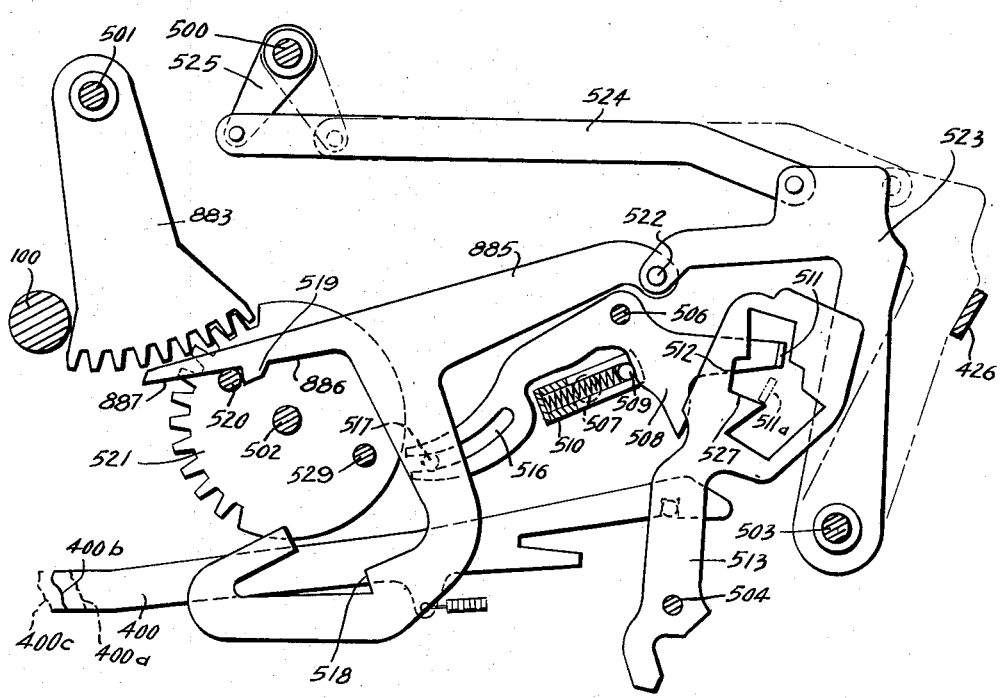

FIGS. 27, 28, and 29 show left-side views of the magnets which control totals and subtotals;

FIGS. 30–35, inclusive, show left-side views of the tumbling mechanisms;

FIGS. 30–45, inclusive, are left-side views of the accumulator tens-carry mechanisms;

FIGS. 46–48, inclusive, show left-side views of mechanisms controlling the functions of the accumulator registers;

FIG. 49 shows a top view of an accumulator register;

FIGS. 50 (sections (a), (b), (c), and (d) being taken together) show the switch diagram for the entire machine;

FIG. 51 is a schematic representation of the electrical controls between the typewriter and the calculating machine.

The invention is disclosed as embodied in an invoicing machine including a value entry mechanism, factor receiving devices, and a calculating mechanism for generating products under the control of the factor receiving devices. Also included is a read-out mechanism for determining the value of the product and for causing a typewriter to type out the value so determined in the calculating product register. A plurality of storage registers are also provided for the accumulation of subtotaled products, discounts, taxes, and other charges which will go into the making up of a total invoice.

*Value Entry Mechanism*

The value entry mechanism comprises in part a pin carriage for receiving values under the control of the typewriter keys. After the values are entered into this pin carriage, the same value is transferred to a second pin carriage and the value standing in the first pin carriage is cleared therefrom. The second pin carriage is subsequently used for the differential control of a plurality of reciprocating racks. Values are transferred selectively from the racks into a multiplicand storage, a multiplier storage mechanism, or to any one of a plurality of selected accumulator registers.

The typewriter keys are used for entering values into the first pin carriage through the intermediary of a plurality of solenoids which are energized under the control of switches operated by the value keys of the typewriter. Since it may be desirable to type numbers without entering values into the calculating mechanism, appropriate switches, described hereinafter, are provided for opening the circuit of the above-mentioned solenoids. Such would be the case during the typing of dates, addresses, etc. in the heading of an invoice.

A simplified description of the operation of the invoicing machine comprising a combined typewriter and calculating machine follows, reference being had to the schematic illustration shown in FIG. 51. The typewriter and the calculating machine have no mechanical connections, being connected solely by electrical wiring as shown. After the heading of the invoice has been typed, a switch 60 is closed by a manually depressable key to indicate that all numeral values subsequently typed on the typewriter are also to be entered into the calculating machine. Depression of a typewriter numeral key closes a selective one of ten switches such as the one schematically illustrated at 63 to complete a circuit through switch 60, switch 61, switch 63 and a solenoid 102, the latter being located on the calculating machine for the purpose of entering a corresponding value into the selection mechanism of the calculating machine. The above-mentioned switch 61 is closed at this time by virtue of the typewriter carriage standing in a columnar position in which it has been predetermined that numeral values may be typed. Switch 61 is closed by any one of a plurality of lugs schematically illustrated at 1000, carried by a typewriter carriage and which lugs successively close the switches 61, switch 963, a second set of switches 61, switch 971, and switch 545.

For purposes of the present example it will be assumed that the invoice (FIG. 2) is so arranged that the number of items purchased is the first numerical value entered. After the operator has typed the number of items and simultaneously entered this value into the keyboard of the calculating machine by operation of the solenoids 102, the selected value is entered into a factor storage mechanism of the calculating machine as follows. Completion of the typing of the number of items moves the typewriter carriage lug 1000 into the position to close the switch 963 and to permit the switch 61 to open. Closure of switch 963 energizes a solenoid 124 carried by the calculating machine, the energization of which enters the selected value into the multiplicand storage mechanism. The operator then tabulates the typewriter carriage to the second columnar position of the invoice where the unit price is entered into the invoice. Such tabulation again closes a similar set of switches 61 so that upon typing the unit price in the typewriter the switch 63 again operates in the manner previously described to enter the selected value into the keyboard of the calculating machine. After such entry is completed the typewriter carriage moves into a zone in which the lug 1000 permits the switch 61 to open and to close the switch 971. This energizes a solenoid 222 in the calculating machine which enters the selected value into a multiplier storage mechanism and automatically initiates a multiplying operation.

The operator then tabulates the typewriter carriage to a position in which a description of the items ordered is typed. The automatic multiplying operation is carried out while the typist enters the description of the order and upon completion of the same the operator tabulates the typewriter carriage to the total column of the invoice at which time a switch 545 is closed to initiate the type-out operation. The closure of switch 545 energizes solenoid 380–R which performs various functions described in detail hereinafter, one of which functions is to transfer the value from the product register of the calculating machine into a plurality of ordinally arranged electrical switches such as the one schematically illustrated at 570. These banks of switches each correspond to the values 0 and 1–9. Meanwhile, a switch 761, is closed as a result of energization of solenoid 380–R to complete a circuit to a corresponding typewriter value key solenoid 802, only one of which is shown. Energization of solenoid 802 operates a key to cause typing of the product value in the total order column of the invoice. The foregoing description has been simplified for the purpose of describing the general overall operation of the machine, a more specific description now following.

Figure 50A:
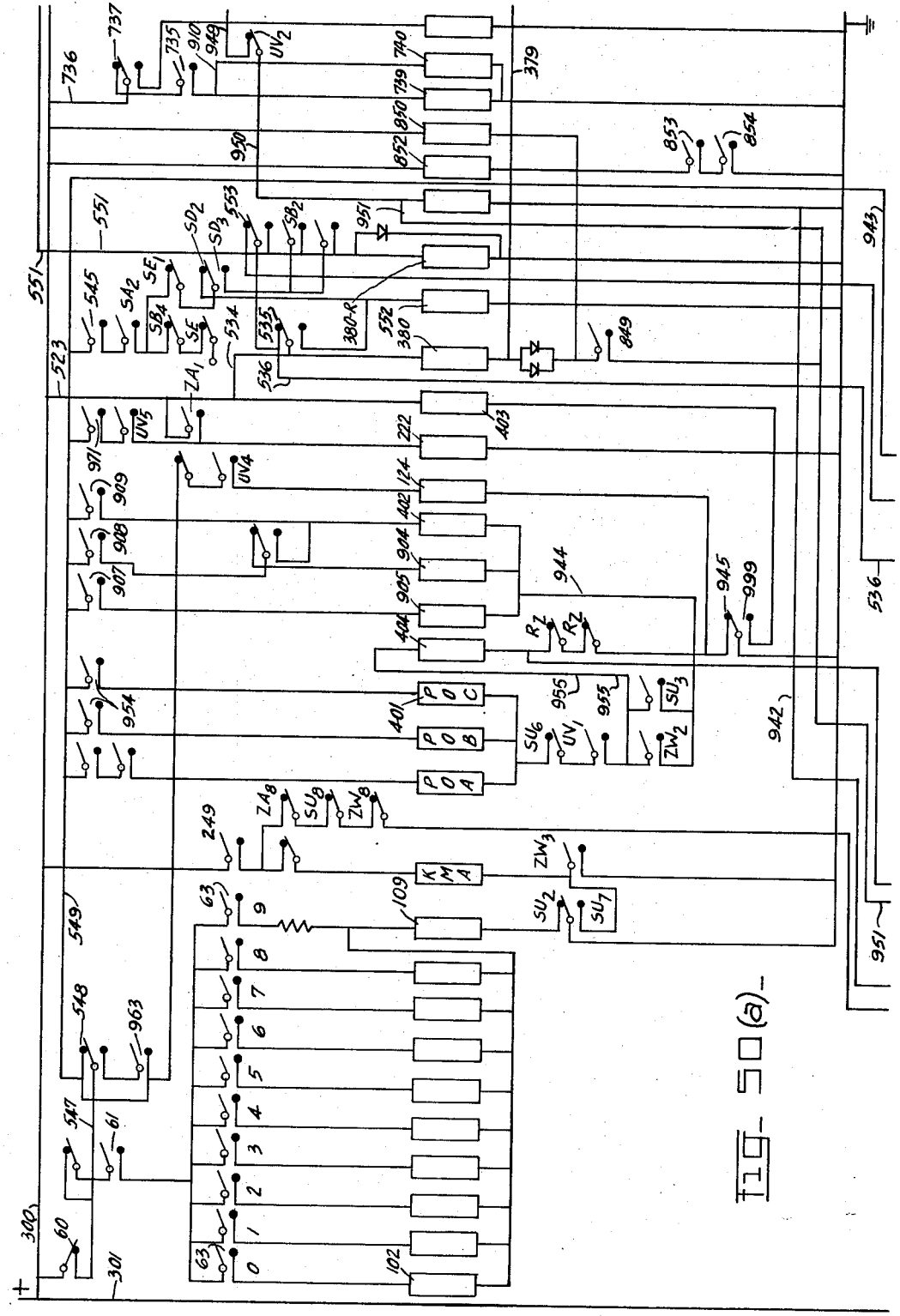

Referring now to a schematic wiring diagram of the machine shown in FIGS. 50A and 51, a manually controlled switch 60 is closed at all times except when the heading of the invoice (FIG. 2) is typed. A switch 61 is closed by a control means described hereinafter whenever the typewriter enters a columnar zone in which the number of items or the price is to be typed. A plurality of ten switches 63 is provided corresponding to the values 0 and 1 through 9.

Depression of a corresponding value typewriter key closes an appropriate one of the switches at the same time that the typewriter prints the value, thus completing a circuit to a respective one of ten solenoids 102 (FIG. 3), of which only five are shown. There are two banks of five solenoids, each solenoid being horizontally supported by appropriate means (not shown) and having an armature 103 which is activated upon actuation of the solenoid. A link 104, pivotally connected at 105 to a fixed framework, carries an extension 106 which overlies a respective one of nine ordinally arranged value pins 107 and an escapement pin 117 forming one row of pins of a conventional pin carriage 115. As shown in FIG. 12, the pin carriage 115 comprises a plurality of ordinally arranged rows of pins 107. In the initial position of the parts, the leftmost ordinal row of pins seen in FIG. 12 stands directly beneath the extensions 106 (FIG. 3), in which position energization of a respective solenoid will cause the extension to be moved downwardly and to depress its corresponding pin 107. Simultaneously with such depression the pin carriage is escaped one order in a direction of increasing value to cause the second ordinal row of pins 107 to underlie the extensions 106. Thus, upon each depression of a typewriter key during the typing of a price per unit and also later during the printing of the number of units to be ordered, an appropriate pin 107 will be depressed to establish a mechanical representation of the price or number of units, as the case may be.

The escapement mechanism for the pin carriage comprises in part the plurality of ordinally arranged pins 117, the leftmost one of which (the rightmost as seen from the rear in FIG. 11) is blocked from rightward movement by a fixed frame member 119; however, upon energization of a solenoid 102 to depress one of the value entry pins 107, an escapement solenoid 109 (FIG. 3) is also energized to cause depression of the currently effective pin 117 out of the path of the blocking element 119. A pair of integral arms 112 and 113 are pivotally mounted upon shaft 111. Arm 112 has pivotal connection with a link operated by the armature of the solenoid 109, and has an extension 116 overlying the pin 117 of the pin carriage. Upon activation of the solenoid, the arms 112 and 113 are rocked counterclockwise against the tension of a spring (not shown), at which time the extension 116 of arm 112 (FIG. 11) depresses the currently underlying pin 117 and arm 113 enters between respective notches 114 of a rack carried by the pin carriage. Then, upon release of the typewriter key and the de-energization of the solenoid 109, the arm 113 is rocked clockwise to its initial position, thus pulling the arm out of the tooth rack to permit the pin carriage to escape towards the left of the machine under the urgency of springs 118 (FIG. 12) to the extent permitted by contact of the next lower order pin 117 with the blocking element 119. Meanwhile, the initial escapement of the pin carriage 115 moves a lug 63 out of holding relationship with switch 64 which is permitted to close. This energizes a relay UV (FIG. 50D), thus closing a switch U.V.4 (FIG. 50A) in the circuit of a solenoid 124, referred to below.

*Multiplicand Entry Mechanism*

Referring now to the invoice sample shown in FIG. 2, the leftmost column thereof indicates the number of items for which the customer is being billed. In the first case, the number of items is 253 pieces, and upon typing of the last digit, the 3, the single step escapement of the typewriter carriage causes a lug 960 (FIGS. 25 and 25A) on a control panel on the typewriter carriage to contact an arm 961 mounted on a fixed framework pivot 962. Arm 961 closes a switch 963 (see also FIG. 51), which energizes the solenoid 124 (FIG. 8). Such energization of the solenoid activates mechanism which closes switch 964 (FIG. 50B) to energize a solenoid 958. Energization of the latter causes engagement of a single cycle clutch (not shown) of the type shown at 430 (FIG. 39 in the Patent No. 2,271,240) which clutch, in the present case, drives the shaft 100 (FIG. 8) for a single complete revolution.

During this revolution of the shaft 100, the value standing in the first pin carriage 115 will be transferred to the second pin carriage 166, and subsequently a plurality of ordinally arranged racks 151 (FIG. 3) will be set to differentially adjusted positions under the control of the second pin carriage.

The rotation of shaft 100 has among its functions the raising of the second pin carriage 166 from the position shown in FIG. 3 so that the pins 167 thereof will be depressed by the depressed pins 107 of the upper pin carriage. This transfers the value to the second pin carriage, where it can control the differential movement of the racks 151. For this purpose, a cam 154 (FIG. 4) is fixed on shaft 100 and carries a stud 155 which, during the first one-quarter cycle of rotation of the cam, rocks a lever 156 clockwise to the dotted line position shown, thus pulling a link 157 towards the left. A toe 158 on the rightmost end of link 157 overlies a bent portion of an arm 159 fixed to shaft 160. Also fixed to shaft 160 are a pair of arms 161 (FIG. 6), only one arm 161 being shown, but each being connected through identical links 163 to respective bellcranks 162, the leftmost end of each of which carries a pin 164. The two pins 164 pivotally support extensions 165 fixed to the second pin carriage 166. From the foregoing description, it is seen that the pin 155 on cam 154 is effective through the described articulated linkage to raise the pin carriage 166 from the position shown in FIG. 3, to the extent that uppermost ends of the pins 167 of the second pin carriage are brought into contact with the depressed and locked pins 107 of the first pin carriage. Since the locking mechanism for the pins of the first pin carriage does not permit the restoration of these pins by the pins of the second pin carriage, the latter are set to value representative positions corresponding to those of the first pin carriage. Conventional detent means (not shown) are provided for holding the pins 167 in either their raised or depressed positions.

An extension 179 (FIG. 12) is fixed beneath the lower framework of the first pin carriage 115 and extends over the zero pins of the second pin carriage. In those orders where a selection has been entered into the upper pin carriage, the upper pin carriage will have been shifted to the left, and therefore the extension 179 will stand toward the left of the selected orders; however, in those orders where no selection has been made, the extension 179 will stand in position to depress all of the zero pins to the left of the highest significant digit, which has been entered into the second pin carriage.

Energization of the solenoid 124 (FIG. 8) meanwhile attracts an armature which is pivotally connected at 133 to a link 128 which in turn is pivotally connected to a lever 129 having pivotal connection with a second lever 130. Energization of the solenoid thus rocks lever 129 counterclockwise so that a hook 136 of the lever 129 is pulled off of a restraining stud 137. At such time a spring 138, acting upon lever 130, pulls lever 130 and lever 129 downwardly, with lever 130 rocking counterclockwise about its pivot 127. At such time a pin 135 carried by lever 130 moves downwardly in the fork 134 of a link 131, thus permitting a torsion spring 140 to rock a lever 132 (to which link 131 is pivotally connected) so that a transverse bail 189 carried by lever 132 is moved downwardly and out of the teeth 141 of a link 142. The latter forms a portion of a first factor receiving device and follows bail 189 until two arms 146—pivoted on 125—hit a stop (not shown) and thus restrain the shaft 145 which is disposed between them and guides 142 by engagement with the shown slot. At such time a spring 149 pulls the link 142—which may be in certain value representing positions to the left of the zero position of FIG. 8 and whose hook 147 moves now in the plane of slope 148—to the extreme rightmost position permitted by the pin and slot connection 145 and into engagement with 150, so that any higher value represented by the links 142 would be cleared. As shown in FIG. 13, the rightmost end of link 142 is pivotally connected to a link 143. The upper end of link 143 is pivotally mounted on a fixed pivot 437 carried by an ordinal key section frame 438. The latter corresponds in function to a key section bearing the reference numeral 101 as shown in the previously mentioned United States Patent No. 2,271,240 disclosing a commercially available calculating machine. According to that patent, a selection bar 120 corresponding to the bar 181 (FIG. 13) of the present application is differentially set under the control of a plural order keyboard in conventional manner. Such setting adjusts an actuator control mechanism for differentially driving the numeral wheels 578 of a product register. The calculating machine of the above-mentioned patent forms the multiplication mechanism of the machine embodied in the structure of the invention, the main difference being that the selection bar 181 in the present case is set under the control of the typewriter and the described value entry mechanism.

As shown in FIG. 13, and described above, the actuation of solenoid 124 results in the engagement of an ear 147 on link 142 with notch 150 on an upstanding member 256 which is integral with the rack 151. With the parts in the condition described, it will be observed that the rack 151 is connected through the upstanding member 256, the notch 150 and the ear 147 to the link 142, the latter, in turn, being connected through link 143 to the selection bar 181. The rack 151 and the bar 181 are shown in their initial zero positions.

The racks 151 (FIG. 3) are urged by springs 178 to move toward the left, but are normally held in their initial zero positions shown by a pair of transverse square shafts 174 and 175, which lie within the rightmost ends of the slots 176 and 177. Shortly after the pins of the second pin carriage have been set to value representative positions the cam 154 (FIG. 5) acts through a follower 170 to pull a link 171 toward the left. Link 171 is pivotally connected to the mid-portion of the link 172, which is fixed at opposite ends to the transverse shafts 174 and 175, previously mentioned to provide for parallel movement of these two shafts, which are reciprocated toward the left and then returned to the initial rightmost position under the control of the cam 154. When the transverse shafts 174 and 175 move toward the left, the springs 178 (FIG. 3) move the racks 151 toward the left to the extent permitted by the respective depressed pins 167 of the second pin carriage. For this purpose a raised shoulder 169 is provided on the rightmost end of each of the racks 151 for contact with a respectively depressed pin 167. It will be observed that there are only nine pins 167, whereas ten values from 0 and 1 to 9 should be represented. In the present case, the nine pins 167 represent the values 0 and 1 to 8 and a fixed stop 180 is provided for representing the value of 9. It will therefore be apparent that in those cases where a 9 is selected, such selection is registered in the upper pin carriage by the absence of the setting of any of the pins 107, and therefore a number 9 solenoid 102 is not required.

From the foregoing description it will be seen that during the first half cycle of operation of shaft 100, cam 154 and follower 170 act through the linkage described to set the selection bars 181 (FIG. 13) of the multiplicand factor storing mechanism to a value corresponding to that which the racks 151 were set. This completes the entry of the multiplicand into the calculating mechanism, and therefore the connection between the racks 151 and the selection bars 181 may be broken. For this purpose the cam 154 (FIG. 10) is provided with a stud 183a which, upon contact with a cam surface 184, rocks a lever 182 counterclockwise. The upper surface 185 of the lever 182 contacts the stud 186, shown in its (down) position 186d, and moves the stud to (upper) position 186u, thus returning the parts to the initial position shown in FIG. 8. The upward movement of stud 186 also causes upward movement of lever 130 and through pin 135 returns link 131 and lever 132 to the initial position shown, where the bail 189 contacts the respective toothed links 142 in their differentially set multiplicand positions and lifts the ear 147 of these links out of the notch 150 of the levers 151, thus breaking the connection between the links 142 and the racks 151. The parts are held in this upper position by virtue of the fact that the hook lever 129 is brought up over the stud 137, and due to the urgency of spring 137, is locked in this position. For purposes not pertinent to the present invention, the lever 182 (FIG. 10) is also held in its counterclockwise rocked position by a shoulder 191 on a lever 192. When lever 182 is rocked counterclockwise, the spring 193 pulls shoulder 191 under stud 190, thus holding lever 182 in its counterclockwise position until near the end of the cycle of operation of shaft 100, at which time the stud 183a contacts the rightmost arm 194 and rocks the lever 192 clockwise to remove the shoulder 191 from beneath the stud 190.

During the latter part of rotation of the shaft 100 a pin 195 (FIG. 20) carried by arm 196 rocks a follower lever 197 clockwise, thus moving a link 198 toward the right and rocking a lever 199, pivotally mounted at 200, in a clockwise direction. At such time, an arm 201 overlying an ear on a lever 202 rocks the lever counterclockwise about its pivot 204, at which time a fork 205 on the rightmost end of the lever causes clockwise movement of a shaft 206 carried by a lever 203, one each being supplied for each ordinal row of pins 167 of the second pin carriage. It will therefore be observed that during the latter part of the cycle of operation of the clutch, the arms 208, in rocking clockwise around the shaft 209, will return any previously depressed pins 167 to their initially raised position.

After the value standing in the first pin carriage has been transferred to the second pin carriage, the first pin carriage may be returned to its initial position and the values cleared therefrom in anticipation of subsequent values being entered therein. For this purpose, a cam 210 (FIG. 15) is fixed on the shaft 100, and acts through a follower lever 211 and link 212 to rock a pin 215 carried by a lever 213, in a counterclockwise direction. Pin 215 (see also FIG. 16) acts through ear 216 on a lever 217 to rock the lever and its connection link 220 upwardly, as seen in FIG. 12, which is toward the right of the machine. Link 220 is connected to the lower frame member of the upper pin carriage, as seen in FIGS. 15 and 17, and therefore the cam 210 is effective through the articulated linkage described to return the pin carriage to its initial position. A cam nose 221 (FIG. 17) is fixed to the framework of the machine, and as the upper pin carriage is returned to the initial position, the lower extremities of the depressed pins 107d are gradually brought against the inclined cam surface, which returns the pins to their initial upward positions 107u. This completes the cycle of operation of the machine and enters a multiplicand value into the calculator, all of which occurs in response to the typing of the number of units ordered in the first column of the invoice (FIG. 2).

*Multiplier Entry Mechanism*

The operator either spaces the typewriter carriage, or preferably, tabulates the typewriter carriage to the selected position in the unit price column where the value $13.00 is entered. In the present case, the operator depresses the tens tab key 970 (FIG. 1) of the typewriter tabulator keyboard to effect tabulation of the carriage in the conventional manner, not described herein. Then during the typing of the last zero in the value $13.00, the typewriter carriage is escaped to a predetermined position in which a lug on the control panel closes a switch 971 (FIGS. 50A and 51) to initiate the entry of the value $13.00 into the calculating machine as a multiplier value. The switch U.V. 5 was closed in a manner similar to the closure of the previously described switch U.V. 4, i.e. the entry of the first digit in the pin carriage during the entry of the value $13.00 closed switch 64 (FIG. 50D) in the circuit of relay U.V. thus closing all switches U.V. 1 to U.V. 5. The closure of the switch 971 therefore energizes solenoid 222 (FIGS. 3 and 50A) which connects a multiplier storage mechanism 223 (FIGS. 3 and 9) with the racks 151, so that the movement of the racks 151 in this case will enter the selected value into the storage mechanism 223. The energization of solenoid 222 (FIG. 3) attracts its armature and pulls a link 128 toward the left, thus rocking a lever 129' counterclockwise off of the stud 137' in identical manner to that described in connection with the multiplicand entry mechanism shown in FIG. 8. At such time the spring 138' (FIG. 3) pulls the lever 129' down, thus rocking the lever 130' and the shaft 127, to which it is fixed, in a clockwise direction. Also, fixed on shaft 127 (FIG. 9) is a multiplier storage mechanism generally indicated at 223, which comprises an insulating block carrying a plurality of contact strips 237 representing the multiplier values zero and 1 through 9. A member 224 is mounted for sliding movement within the insulated block, there being provided one such sliding member 224 for each actuator rack 151. The upper leftmost end of the bar 224 carries a pivot on which is mounted a contact member 236, which is spring urged into engagement with the contact strips 237. A lower extension of the member 224 has teeth 232 formed therein, spaced to correspond to the spacing between the strips 237, and the member 224 is spring urged toward the right by means of a spring 235. In the initial position of the parts the rightmost end of member 224 is standing counterclockwise from the position shown in FIG. 9; however, upon energization of the solenoid 222, as described above, the member 224 is rocked to the position shown in FIG. 9, where the rightmost end of the member stands in a plane of movement of a pin 225 carried by the extension 256 of rack 151. Meanwhile, pin 231' (FIG. 14) on lever 130' has rocked downwardly from the position shown, thus permitting lever 230 and its integral arm 228 to rock clockwise about pivot 229. This permits a stud 227 on lever 226 to rock downwardly under the force of its spring (not shown) so that a bail on the leftmost end of the lever is rocked out of the teeth 232, previously mentioned. At such time, the spring 235 (FIG. 9) pulls member 224 toward the right and into contact with the pin 225.

Simultaneously with such movement the clockwise rocking of lever 130' closed the switch 972 (FIG. 50B) which energizes the solenoid 958 and engages the single cycle clutch for driving the shaft 100 as previously described. It will be recalled that the rotation of the shaft 100 permits, among other functions, the yieldable movement of the racks 151 in response to their springs 178 (FIG. 3) and under the control of the value standing in the second pin carriage.

Rack springs 178 are stronger than the springs 235 (FIG. 9) and therefore the rack 151 acts through the extension 256 and the pin 225 to move the respective members 224 toward the left under the control of the value standing in the pin carriage. This moves the contact member 238 to a position over a respective contact strip 237 corresponding to the value entered in the respective order. All of the members 224 are then locked in their current value representative positions by the ear on the leftmost end of lever 226, which lever is rocked clockwise to engage the ear with the respective notches 232. Such locking occurs under the control of the lever 130' (FIG. 14), which is returned to the initial position in the same manner that its companion lever 130 was returned to its initial position by a cam corresponding to 154 (FIG. 10). When lever 130' (FIG. 14) is moved upwardly to initial position, a pin 231' rocks lever 230 and its integral arm 228 counterclockwise about the pivot 229, and through impingement upon pin 227, it rocks the lever 226 into engagement with the notches 232, as mentioned before.

Thus, the multiplier representative slides 224 (FIG. 9) are locked in their respective value representative positions in preparation for the multiplying operation. The contract strips 237 each form a portion of a now incomplete circuit for the control of ten multiplier solenoids, one of which is energized in each order to control the ordinal multiplication as described hereinafter.

After the members 224 are locked in their respective positions, the shaft 100 acts through the previously described cams to restore the pins of the first and second pin carriages to their original initial positions. This completes the multiplier value entering operation, whereupon the actual multiplying operation is automatically initiated.

*Multiplying Mechanism*

The previously described movement of the link 129' from the position shown in FIG. 3 to that shown in FIG. 14 conditions a mechanism whereby the return movement of the link will initiate the multiplying operation. Link 129' carries a live tip 239 mounted thereon and spring urged in a counterclockwise direction against a stop pin 241 carried by a lever 243. Upon downward movement of link 129' the live tip is also carried downwardly to the position shown in FIG. 14, where a step 247 on the live tip moves underneath the stop 241, thus permitting the live tip to rock counterclockwise into latching engagement with the stop. Then upon return upward movement of the link 129' to its initial position, the live tip will carry the stop 241 and its supporting lever 243 upwardly, at which time a fixed pin 248 on lever 243 closes a switch 249 which initiates the multiplying operation.

Referring now to the wiring diagram shown in FIGS. 50(a) and 50(c), the switch 249 completes a circuit to the normally closed switches $ZA_8$, $SU_8$ and $ZW_8$ through the winding of a relay MU. The relay in turn closes switch $MU_2$ shown in FIG. 50(b) in a circuit from the main power supply 300 through lead 301, shown in fragment at the bottom of FIG. 50(b), to the normally closed switch $SU_4$ to lead 303 and through one of the branch leads 310 to 319 to a respective multiplier solenoid 320 to 329, depending upon the multiplier value which has been determined, in later described manner, as the value of the lowest multiplier order. Referring to FIG. 9, it will be recalled that in each order in which a multiplier value has been entered the contact 238 will be standing on a selected one of the contact strips 237. In FIG. 50(b) the contact strips 237 are individually shown and are numbered 237–0 to 237–9 to represent the multiplier values 0 to 9, and the contacts 238 will each be standing on a respective one of the strips 237–0 to 237–9 depending upon the multiplier selection made. The contacts 238 are scanned by mechanism described shortly hereinafter, and in the present case it is the lowermost one which is in circuit at the present time so that the circuit is completed through the leads 378 and 240, switch 361 (closed by a scanning tip 280 as described hereinafter), lead 242, and the normally closed switch $SC_1$ and the switch $MU_2$ (now closed as described above) to energize the 0 multiplier solenoid 320. The multiplier solenoids 320 to 329 are also shown in side view (FIG. 24) each solenoid, upon energization thereof, pulling down a link 343. Each link 343 (FIG. 24A) is pivotally mounted at 344 and the leftmost end of the link has operating connection with the top of a respective multiplier key 350 to 359, which keys correspond to the multiplier keys 2001 shown in FIG. 59 of the previously mentioned U.S. Patent No. 2,271,240.

Thus, upon energization of one of the respective ten multiplier solenoids, a corresponding multiplier key will be depressed to initiate a multiplying operation in the same manner as if the operator had depressed the key manually. During the multiplying operation the value standing in the multiplicand entry mechanism previously described is multiplied by the value of the selected multiplier key and the product thereof entered into the numeral wheels of a product register. After one of the multiplier solenoids 320 to 329 has been energized to initiate either a zero shift or a multiplying operation followed by an automatic shift, the circuit of the multiplier solenoids is broken until the shift is completed by the following mechanism. Two switches 265 and 266 shown in FIG. 50(c) are provided in parallel in the circuit of a relay switch SC which, when energized, opens the switch $SC_1$ (FIG. 50B) in the circuit of the multiplier solenoids. Switch 265 is automatically closed during each multiplying operation by the engagement of a numeral wheel actuator clutch (not shown). Switch 266 is closed during each shifting operation as follows: A toothed rack 270 (FIG. 22) is fixed to the framework of the carriage 271 which carriage is shifted one order in an ascending direction at the conclusion of each multiplying operation. A gear 272, fixed on shaft 273, meshes with the rack 270 and is rotated one increment for each ordinal shift of the carriage 271. At such time, a gear 274 fixed on shaft 273 and hidden behind a large gear 275 drives the latter through one-eighth of a revolution. Gear 275 is connected by means of three connecting studs 276 to a disk 277 having eigth notches 278 cut therein. In the initial position of the parts as shown in FIG. 23, a notch 278 stands opposite an extension on one leaf of the switch 266, thus permitting the switch to stand in its normally open position. During any shift of the carriage 271, however, the disk 277 will be rotated one-eigth of a revolution during which the disk 277 will close the switch 266 for the purposes mentioned above. The shaft 279 is fixed at one end to the disk 277 and the opposite end of the shaft is suitably supported within the framework of the machine. A multiplier scanner cam 241 is fixed on shaft 279 and in the initial position of the parts shown ejects a pin 280 through a fixed support 281 to close a switch 361 (FIG. 50B) which forms a portion of the multiplier read-out mechanism previously described. Eight switches corresponding to the two switches 361 and 365 (FIG. 22) are carried by the support 281. The first seven switches are used for controlling the energization of a selected multiplier solenoid and the last switch is used for initiating a tabulation of the product carriage to its leftmost initial position.

Thus, it is seen that seven ordinal multiplying operations are possible, which multiplying operations are automatically initiated one after the other, by the shifting of the register carriage and the operation of scanner 241. It will be recalled that the switch $MU_2$ shown in FIG. 50(b) is held closed until multiplying operation in all orders is completed and that the switch $SC_1$ is opened during each ordinal multiplying operation and each shifting operation. At the conclusion of the shifting operation described above, the switch $SC_1$ will again be closed to complete a circuit through the switch 362, which is closed by the multiplier scanner 241, through the lead 372 to one of the contact strips 237–0, 237–9, depending upon the value of the current selected multiplier. From one of the contact strips the circuit is completed through a selected multiplier solenoid 320, 329 in the usual manner to initiate the current ordinal multiplying operation followed by its automatic shift.

The above sequence of operations is continued from order to order until after seven ordinal multiplications have been completed. After the shift cycle followed by the seventh ordinal multiplication the scanner 241 shown in FIG. 50(b) closes contacts 238, thus completing a circuit through switches $MU_2$, $SC_1$, 368 to 379, a solenoid 380 (FIG. 50A) leads 534 and 523 to the main lead 300. The armature 381 (FIG. 24A) of solenoid 380–1 actuates a key stem 382 corresponding to the key stem 200a disclosed in United States Patent No. 2,502,321, wherein a depression of the key initiates return tabulation of the multiplying calculator carriage to its initial leftmost position. This is the condition of the parts with the machine prepared for the automatic typing out of the product from the product register.

Decimal Read-Out Aligning Mechanism

According to a preferred embodiment of the invention, a decimal point is printed during read-out between the second and third rightmost digits, so that the printed value is expressed in the terms of dollars and cents, in the usual manner. If the product generated during the multiplying operation also contains two decimal places, then no shifting of the product register relative to the read-out mechanism is required prior to the read-out operation. Under certain conditions, however, more than two decimal places will have been generated, and therefore the product register must be shifted to the proper position of decimal alignment with the read-out decimal position before the read-out operation is initiated. The shifting operation is initiated under the control of selected ones of a plurality of tabulator solenoids and the determination of which solenoid is to be energized is controlled by the number of decimal digits which are entered in the multiplier and multiplicand factor storing mechanisms. The tabulator solenoids and associated mechanisms will be described first, followed by a description of the manner in which the multiplier and multiplicand value entry mechanism controls which solenoid is to be energized.

The tabulating mechanism comprises eight tabulator solenoids such as the solenoid 380–0 (FIG. 24A) which solenoids are ordinally arranged to overlie eight respective similar key stems 382. As disclosed in the Patent No. 2,502,321, the rightmost end key stem 382 and the leftmost end key stem are each "live" tabulated keys, viz., depression of either one of these keys initiates a tabulation of the carriage to a respective endmost position, provided none of the intermediate tabulator keys are depressed. The six intermediate tabulator keys between the two endmost live keys are merely conditioning keys, and the arrangement is such that if a live tabulator key is depressed while one of the tabulator conditioning keys is depressed, then tabulation in a respective direction is initiated to a position corresponding to the location of the depressed conditioning key. Assume that the product generated in the product register contains four decimal places. Since the read-out mechanism contains but two decimal places, the product register must be shifted two orders toward the right to align the product decimal with the readout decimal. This is accomplished by depressing an intermediate tabulator conditioning key which is located two orders to the left of the rightmost tabulator key, since a two-order shift is required, and simultaneously therewith depressing the live tabulator key to initiate the tabulation toward the right to a position corresponding to the depressed conditioning key. The left endmost tabulator key initiates the rightward tabulation of the product register, which is terminated when the register reaches a position corresponding to the location of the depressed conditioning key, which, in the present case, is two orders to the right of the initial starting position. In this manner, a two-order rightward shift of the register carriage is accomplished.

The selection of which solenoids are to be energized is determined under the control of a plurality of stepping relays which are operated during the entry of the multiplier and multiplicand decimal values into the machine. Referring to FIG. 50C, the switch 531 represents a switch fixed upon the main body of the typewriter and which switch is closed in selected orders of escapement of the typewriter carriage under the control of the program panel previously mentioned. It will therefore be assumed, then, that switch 531 is closed throughout the entry of the multiplier and multiplicand values.

Switch 532, immediately below switch 531, is closed each time a typewriter key is depressed corresponding to one of the numbers 0 and 1 through 9. Therefore, during the entry of each digit of the multiplier and multiplicand values, a circuit is closed from the main lead 300 (FIG. 50A), leads 523, 534, the normally closed switch 535, leads 536, 537, and 538 (FIG. 50C) through the closed switch 531, closed switch 532, and through solenoid VV to ground. Each energization of the solenoid VV closes a switch VV1 located in the circuit of the adjacent relay VA. Therefore, each time that VV is energized, VA is also energized through the previously mentioned lead 537, lead 540 to the windings of VA, the normally closed switch VB1, the closed switch VV1 and the normally closed switch VB3 to ground. The energization of VA closes switch VA1, thus completing a holding circuit through the winding of VA through VA1 and the winding of VB. VA and VB are therefore held energized, even though VV drops out upon the opening of switch 532. Upon the entry of the second fractional digit, switch 532 is closed again to energize VV, thus closing the switch VV1. Since VA and VB are energized at the time VV is energized, VA is dropped out by the energization of VV through the circuit including the winding of VA, VA1, VB2, VV1, and VB4 back to lead 540. VB remains energized through VB2, VV1, VB4 to lead 540 until switch 532 is opened, de-energizing VV and opening the switch VV1.

From the foregoing description it will be apparent that relays VA and VB are both energized upon the first closing of switch 532, and that these two relays are de-energized upon the second closing of switch 532. When VA is energized the first time, a circuit is completed from lead 537 through VA3, KB1, and the winding of relay KA to energize the latter. This, in turn, closes switch KA1 to complete a holding circuit for relay KA. Upon entry of the second fractional digit, VA drops out and this energizes relay KB through the reclosing of switch VA2, the closed switch KA2, and the normally closed switch KC1. The energization of relay KB closes switch KB3 in holding circuit for relay KB. If a third fractional digit is entered, then relay VA is re-energized, thus completing a circuit through the winding of relay KC by closing switch VA3, through the closed switch KB2 and the normally closed switch KD1. A holding switch KC3 is provided for relay KC similar to that provided for relay KA and relay KB. From the foregoing description, it is believed apparent that relay KD will be energized and held energized by the entry of a fourth fractional digit, and that relay KE will be energized and held energized by the entry of a fifth fractional digit.

Referring now to the invoice shown in FIG. 2, the first item ordered, 253 pieces @ $13.00 each, results in a product having only two decimal places, and since the present machine is so designed as to automatically print out two decimal places when the carriage is standing in its initial leftmost position, no provision is made for closing the switch 532 shown in FIG. 50(c) during the entry of the first item. The same condition holds for the second item of 2 tons @ $25.32, where again the product contains but two decimal digits. The third and fourth items of the invoice generate products having three and five decimal digits, respectively. In the first case, the switch 532 would be closed but once, and in the second case, this switch would be closed three times. For purposes of illustration, the latter example will be followed, wherein a product is generated having five fractional decimal digits, which is three fractional digits in excess of the normal two provided for. Therefore, the relays VV, VA, VB will be operated in a manner previously described so that at the end of the entry of .125 ton × $21.00, the relays KA, KB and KC will stand energized. It will also be recalled that when a multiplier value stands stored in the multiplier matrix 223 (FIG. 14), the switch 249 is held closed. This energizes the multiplier relay MU (FIG. 50A) and through a parallel circuitry it also energizes the relays SA and SD. A relay SB is also provided in parallel with relay VV, so that the relay SB is operated whenever relay VV is operated. Energization of relays SA and SB closes respective switches SA1 and SB1 to hold these relays in circuit when once energized. Similarly, relay SD is held in when energized by operation of switch SD1. A relay SE is energized whenever relay SC is energized.

Now, assuming that the 100M tabulator key (FIG. 1) is depressed to escape the typewriter platen and the invoice to a position in which the product of .125 × $21 is to be entered, such escapement closes a switch 545 shown in (FIGS. 50A and 51), thus completing a circuit from the main lead 300 through the switch 60, which is closed whenever values are entered from the typewriter into the calculator, and therefrom through the lead 547 and the normally closed switch 548 to lead 549, the closed switch 545, switch SA2 (now closed due to energization of relay SA), switch SE1 (now closed, assuming that the multiplying calculator has completed the multiplying operation and is neither multiplying nor shifting), SD3 (now closed due to energization of SD) and SB2 (now closed) to energize the right tabulator solenoid 380–R. The latter acts through its respective armature and sub key stem 382, shown in FIG. 13, to initiate a continuous tabulation of the product register toward the right. Simultaneously with such energization, however, an appropriate tabulation terminating solenoid 380–1 to 380–6 is energized corresponding to the number of decimal digits, in excess of two, which have been entered into the multiplying calculator. In the present case, a decimal count of three was made, and therefore relays KA, KB and KC were energized, as previously described. For this purpose a parallel circuit is provided, branching from switch SB2 through lead 551 (FIG. 50B), switch KA4, KB5, KC4, KD4, PZ7 and PM6 to solenoid 380–3. The energization of the latter depresses its corresponding key stem 382 (FIG. 13) and, as described in the previously mentioned Patent 2,502,321, establishes a mechanical representation of the order in which the shifting is to be terminated. In the present case, such shifting will be terminated after a three order rightward shift. This properly aligns the decimal in the product register with the decimal in the read-out mechanism.

In certain cases the unit price will be expressed in terms of per 100 or per 1,000, and for this purpose an appropriately marked key 0/0, 0/00 (FIG. 1) is provided for printing an indication of per 100ths or per 1000ths. When 0/00 is intended the upper case shift key must be depressed, as usual. Depression of such keys not only effects printing of the symbol, but at the same time energizes a respective relay so as to condition the tabulating mechanism for shifting the product register two or three more orders toward the right as the case may be. For example, assume that a value is expressed in terms of per 100 and that the key 0/0 is depressed. This closes a switch 840 (FIG. 30). Immediately above 840 is a switch 841 which is closed whenever the control panel has ben adjusted to permit the calculation of price per 100 or price per 1000 so that the closure of switch 840 completes a circuit from the main lead 300, switch 60, switch 957, lead 547, switch 548, lead 549, lead 943 (FIG. 50B), switches 841, 840, leads 842, 843, 844 and switch 845 through the winding PZ of a percent solenoid to ground 773. Energization of relay PZ closes each of a plurality of switches PZ1, PZ3, PZ5, PZ7, PZ9 (FIG. 50B), and opens each of a plurality of switches PZ2, PZ4, PZ6, PZ8, PZ10, in the control circuits of the solenoid 380–1 to 380–6. It will be recalled that in the above example the solenoid 380–3 was energized; however, if the 0/0 key had been depressed to energize PZ then the above switches would have been opened and closed as described and the solenoid 380–5 would have been energized rather than solenoid 380–3.

Similarly, if the 0/00 key and the case shift key had been depressed then switch 845A would be closed and solenoid PM would be energized. Then switches PM1, PM3, PM5, PM7, PM9, will be opened and the switches PM₂, PM₄, PM₆, PM₈ and PM₁₀, will be closed, in which case the above described circuit, starting with lead 551, is completed through KA₄, KB₅, KC₄, KD₄, PZ₇, and PM₇, to the number 6 solenoid 380-6. From the foregoing description, it should be clear that in those cases where the 0/0 key is depressed, the relays are automatically operated to shift the tab selection two orders in an ascending direction, regardless of which tabulator solenoid would otherwise have been selected, and that where the 0/00 key is depressed that the selection will be shifted three orders.

*Product Read-Out Matrix*

After the product register is brought to a position of decimal alignment with the read-out mechanism, several operations must be performed in sequence before the product value is typed on the invoice. First, a solenoid 552 (FIG. 24) is energized to engage the numeral wheels of a read-out matrix with respective numeral wheels of the product register. The numeral wheels of the product register are then set to zero, during which ordinally arranged bars, carrying switch contacts, are set in accordance with the value standing in their aligned numeral wheels. A half-cent roundout mechanism is then brought into play, so that the product will be subsequently printed to the nearest half-cent value, and thereafter appropriate mechanisms are brought into play to return the read-out mechanism to its initial position and to restore the ordinally aligned matrix bars to their original position. The typeout of the product occurs before the restore operations take place.

Figure 26:
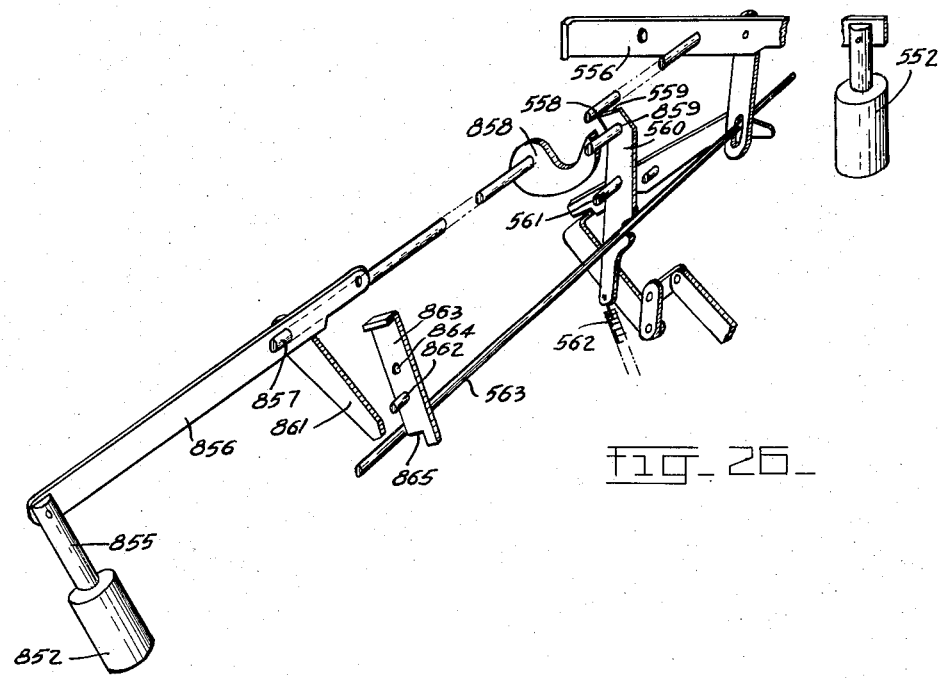
FIGS. 26a and 26b show left-side views of product-scanner components.

The readout engaging solenoid 552 (FIGS. 24 and 50A) is energized as follows: it will be recalled that the solenoid 380R was previously energized to initiate tabulation of the product register to its position of decimal line up with the read-out mechanism. At such time, the armature of the solenoid 380R opens the normally closed switch 553 in the holding circuit of relay SD (FIG. 50C). SD therefore becomes de-energized, thus opening switches SD1 and SD3 and returning switch SD2 to the position shown in FIG. 50A. This completes circuit from the lead 549 through the closed switches 545, SA2, SE1 and SD2 to the solenoid 552. Energization of the solenoid pulls the armature 554 (FIG. 24) downwardly, thus acting through the pivot 555 to rock a lever 556 clockwise about its fixed pivot 557. At such time, a pin 558, shown in FIG. 26, but eliminated from FIG. 24 for purposes of clarity, is moved downwardly onto a camming surface 559 of a latch 560. The latter is pivotally mounted as at 561 and is urged by a spring 562 into engagement with a transverse shaft 563. Energization of the solenoid rocks the latch clockwise out of restraining engagement with the transverse shaft 563, and shortly thereafter, the upper end of a slot 564 (FIG. 24) embracing shaft 563, and formed in a link 565 depending from lever 556, moves the shaft 563 downwardly and to the left, as seen in FIG. 24. Shaft 563 is fixed in the framework of a product matrix generally indicated at 570 in FIG. 9. The matrix includes a framework 571 pivotally mounted at 572 to the framework of the machine, and upon which frame is slideably mounted a plurality of ordinally arranged racks 573. A pair of sliding contacts 574, 575 are carried by each slide 573 and moved therewith. The contacts 574, 575 cooperated with the commutator strip 579 and a selected one of the read-out value contacts 580 to 589, corresponding to the value of the product digit in the respective order, as will be made more clear hereinafter.

A cross shaft 576 is also carried by the matrix framework upon which shaft are mounted a plurality of ordinally arranged gears 577, which are in engagement with the racks 573. When the matrix is rocked clockwise about the shaft 572 by the downward movement of shaft 563 as above-described, the gears 577 are brought into mesh with gears 578 of the product register. Meanwhile, pin 558 (FIG. 26) has rocked past the cam surface 559 and has released the latch 560, which, under the urgency of a spring 562, re-engages the shaft 563 in its lowermost position, thus holding the product matrix in engagement with the numeral wheels 578.

The above-described downward movement of shaft 563 (FIG. 24) rocks an underlying lever 590 clockwise about its fixed pivot 591, thus removing the latching hook 592 from restraining engagement with a lever 593. The latter is pivotally mounted at 594 and is spring urged clockwise by spring 895 through the articulated linkage shown. At such time, an arm 596 also fixed on shaft 594 (FIG. 13) rocks clockwise to move a transverse bail 597 away from depending tails 598 on the slides 573. This releases the slides 573 to the urgency of springs 599, anchored at their right ends to the framework of the machine, thus tending to move the slides 573 towards the right; however, the numeral wheel gears 578, which are engaged with gears 577 at this time, are locked by numeral wheel detents (not shown), thus holding the slides 573 in the position shown until the numeral wheels 578 are reset to their zero positions. Such resetting occurs in the following manner: during the final clockwise movement of lever 556 (FIG. 24) the leftmost end 734 permits a switch 735 to close. Switch 735 (FIG. 30) is in a circuit including the main lead 300, a lead 736, a normally closed switch 737, and lead 738 to a product register clear clutch engaging solenoid 739 (FIG. 24A). The energization of solenoid 739 acts through a link 740 to operate a lever 741, corresponding in function to the lever 379 shown in FIG. 12 of the United States Patent No. 2,291,135, which lever causes engagement of a clutch (not shown) and resets the product register dials to zero registration, all as is fully described in the last-mentioned patent. During resetting, each numeral wheel gear 578 (FIG. 9) is rotated in a counterclockwise direction against a zero stop, at which time the gear 577 drives its associated rack 573 downwardly and towards the front of the machine by a differential amount corresponding to the value which previously stood in the numeral wheel. When the numeral wheel reaches zero, the contact 575 will stand on a respective contact strip 580 to 589, thus establishing an electrical representation of the value which previously stood in the numeral wheel 578. Thus, each of the contacts 579 stands at a value representative position, which positions are serially scanned by the following mechanism.

*Read-Out Mechanism*

At the same time that the previously mentioned numeral wheel clearance clutch engaging solenoid 739 is energized, a printout scanner initiate solenoid 740 is energized through a parallel circuit to engage a single cycle clutch and serially read out the product values, starting with the highest order of the product and progressing through lower orders. Referring to FIG. 19, energization of the solenoid 740 acts through its armature 741 to pull an arm 742 on a shaft 743 to rock the shaft and its integral clutch control dog 744 in appropriate direction to engage a single cycle clutch 745. The clutch 745 is identical to the clutch 431 described in the previously mentioned Patent No. 2,271,240, and which clutch 745, when engaged by a single pulsing of the solenoid 741, drives a shaft 746 for a single complete revolution and then comes to rest in the initial position. When the clutch control dog 744 is rocked to clutch engaging position, it closes a pair of contacts in the circuit of a motor (not shown) to maintain the motor energized and to drive a shaft 747 continuously until the clutch 745 returns to its initial position. At such time, the motor contacts are again opened and the motor driven shaft 747 comes to rest. A printout scanner, generally indicated at 750 comprises a body section 751 fixed to the framework of the machine, upon which body section a plurality of switches are mounted. A reduced portion of the clutch driven shaft 746 passes through an aperture in the body portion 751 and is supported at its rightmost end by the fixed frame 752. Suitably fixed to the reduced shaft portion is a cam 753 which, upon rotation of the shaft, is serially brought into contact with a plurality of radially slidable plungers 754, each of which plungers operates an associated set of switch contacts, as described shortly hereinafter. Also fixed to the shaft 746 are a plurality of cams 755 to 760, inclusive, which cams operate switches in a manner presently made clear. In the initial position of the parts as shown, the high portion of cam 753 is not in contact with any of the plungers 754, the arrangement being that since the clearance solenoid 739 (FIG. 24A) and the scanner solenoid 740 are energized at the same time, sufficient time must be provided to permit clearance of the product register numeral wheels before the high point of cam 753 is rotated to its first printout position, where it ejects the first plunger 754. The printout scanner is schematically illustrated in FIG. 50B, wherein the reference numeral 753 represents the cam of FIG. 19, which acts to serially close the switches 761 through 769, inclusive.

It will be noted that nine switches are provided for printing out a product value, whereas in the present embodiment only eight product digits are actually printed. The switch 767 shown in FIG. 50D corresponds to the decimal point located between the second and third lowermost orders of the product, and for convenience in the schematic wiring diagram, has not been shown as located between the switches 766 and 768 of the print out scanner; however, in the physical embodiment, the switch 767 is closed after switch 766 and before switch 768. Further reference to this switch and to the solenoid it controls is made hereinafter. Before the scanner is brought into operation, however, certain portions of the scanning circuit must be closed to prepare the scanner for proper operation. For this purpose, a switch 772 (FIG. 24) is closed when the previously mentioned solenoid 552 is energized and the lever 590 is rocked in a clockwise direction. This closes switch 772 and, as seen in FIG. 50, partially completes a circuit of the scanner mechanism from the ground lead 773 through branch lead 774 and switch 772 to the contact 761. Thus, when the scanner 750 (FIG. 19) is operated by engagement of the clutch 745 the switch 761 is closed, completing a circuit through lead 774, the normally closed switch 775 to the first feeler contact 579 product read matrix (see also FIG. 13). The feeler contact 575 will stand upon one of the strips 580 to 589, depending upon the value of the highest, or leftmost order numeral wheel. Referring again to the invoice in FIG. 2, and the illustration in which .125 ton is being multiplied by $21.00/ton=$2.625, the value is rounded out to the nearest half-cent, which in the present case, is $2.63. However, since multiplication always starts in the sixth order to the left of the decimal point, the value sensed will be 000002.63 and therefore five zeros will be sensed before the value of 2.63 will be printed out.

The machine is equipped with a zero suppression mechanism to prevent the printing of non-significant zeros which stand to the left of the first significant digit other than zero, which in the present case, is the digit 2. Thus, the sensing feeler 575 (FIG. 50B) stands on the contact strip 580, which partially completes a circuit through the lead 776. Switch 777 is closed when the previously mentioned shaft 563 (FIG. 26B) is moved downwardly to the position shown. The switch $AN_1$ is normally open, however, thus preventing the printing of a zero, even though switches 779 and 780 (FIG. 19) were closed by cam 775 to connect switch $AN_1$ to the positive lead 301. Switches 779 and 780 are closed almost immediately upon rotation of the cam and are held closed until substantially the end of the scanner cycle operation.

Since switch $AN_1$ is open, the zero printing solenoid 800 remains de-energized; however, even though a zero is not printed, the typewriter carriage must be spaced one order toward the left, bringing the next printing order of the invoice into alignment with the typewriter mechanism. For this purpose a switch 781 (FIG. 50D) is provided in the circuit of a solenoid 782 which actuates the space bar mechanism of the typewriter. Switch 781 is closed under the control of a cam 760 (FIG. 19) which has a plurality of cam risers for closing the switch at the same time that the scanner 753 closes the switches 761, 762, etc. of the scanning mechanism. The closing of switch 781 completes a circuit from the main branch lead 301 through the switch 781 and the normally closed switch $AN_2$ to the windings of the solenoid 782, and from the windings to ground, as shown. Since there are five zeros in the value 000002.63, the typewriter platen carriage will be escaped once for each zero in the manner described above as the scanner progresses through the first five switches 761 through 765, inclusive. Then, when switch 766 is closed, the digit 2 will be printed, since the feeler 575 of the scanner mechanism stands on the contact strip 582, thus completing a circuit through the No. 2 print solenoid 802 to lead 785, lead 786, the closed switches 779, 780 to the main lead 300. At such time, the digit 2 is printed and the typewriter platen carriage is escaped in the conventional manner. Simultaneously therewith, a pulse is transmitted from the previously mentioned lead 785 through lead 787 (FIGS. 50D and 50C) through the normally closed switch 788 through the windings of the solenoid AN, the normally closed switch 790, to the main branch lead 301. The energization of solenoid AN closes switch AN1 (FIG. 50B) in the circuit of the zero print solenoid 800 so that any zeros which follow the first significant digit will be printed. The print scanner 753 next closes the switch 767 (FIG. 50D) to complete a circuit from the lead 791 (FIGS. 50B and 50D) switch 767 and solenoid 792, the lead 793, lead 787 (FIG. 50B), leads 785, 786, and the switches 779 and 780 (closed by scanner 750 as previously described) to the main lead 300. The energization of solenoid 792 causes printing of the decimal point. The scanner then sequentially closes the switches 768 and 769 (FIG. 50B) to print out the values 6 and 3 in the manner described above, the 2 being changed to a value of 3 by a half-cent round-out mechanism now described.

Half-Cent Round-Out Mechanism

Referring now to FIG. 50B, the reference numeral 579′ designates a scanner sensing finger which is parallel to the scanner finger 579. It will be observed that if a switch 775 is opened and the associated switch 811 is closed, then the operation of the scanning mechanism and the closing of the switch 761 will throw finger 579′ in circuit instead of finger 579. This causes the pulsing of the print solenoid 801 instead of the zero print solenoid 800. Similarly, if the feeler 579 stands on the No. 2 print contact strip 582, then the feeler 579 will stand on the No. 3 print contact strip 583. Thus, in each case where the print-out control is shifted to the feeler 579′ a value of 1 greater than the normally sensed value will be printed. Switches 775 and 811 are provided for each of the ten feelers, and are operated under the control of a plurality of respective solenoids 820 to 827 (FIG. 50D). A contact 830 (FIG. 50B) adjacent the lowest order finger 579 is provided for sensing the value standing in the mills order of the product matrix. If the value standing in this order is a 5 or greater, thus indicating that the "cents" order is to be increased by 1, then a circuit is closed from the main lead 300, lead 831 to the contact strip 832, which spans the values 5 through 9, inclusive. The circuit continues from contact strip 832 through feeler 830, lead 833 (FIG. 50D), and relay 820 to ground, thus energizing relay 820. The energization of relay 820 closes the previously mentioned switch 811 (FIG. 50B) of the units order feeler 579' and opens the switch 775 of the same feeler to thereby transfer control of the scanning mechanism to the feeler 579'. In the example given above in connection with the invoice, the value standing in the mills order is a 5 and therefore the cents order is increased from a value of 2 to a value of 3, so that the value finally printed out is $2.63. It will be apparent that if the value of the cents digit were a 9, then, during half-cent round-off the 9 would have to be changed to a 0 and a 1 carried into the next higher order. Similarly, if the next higher order were a 9, then a 1 would have to be carried into the next adjacent higher order, etc., thus creating what is known in the art as a chain carry. For this purpose the energization of relay 820 as described above also closes a switch 820' in the circuit of the adjacent higher order relay 821. A switch 835 is also provided in series with switch 820' and the respective switches 835 are closed whenever the associated matrix slide stands at a registration of 9.

Referring to FIG. 13 it will be noted that if the rack 573 is moved toward the right to its extreme 9 position, the insulated tip of the rack will close the switch 835. Assuming that switch 820' (FIG. 50D) was closed by the presence of a value of 5 or greater in the mills order, then the closure of switch 835 completes a circuit from the lead 301 to ground, thus energizing the relay 821. The latter closes the respective contacts 811 and opens a contact 775 associated with feelers 579 and 579' of the next adjacent higher order to increase the value sensed by a single increment, in the same manner as described in connection with the first order. The energization of relay 821 in turn causes closure of switch 821' in the circuit of the next adjacent higher order relay 822, and this arrangement has provided for the remaining higher order relays 823 and their respective switches 823'. From the foregoing description it will be apparent that if the mills order of the product register stands at a value of 2 to a value of 3, so that the value finally printed product register will be increased by a value of 1, and furthermore, where the cents and/or higher adjacent consecutive order stand at values of 9, a chain carry will be effected by the increase of the units order by a value of 1.

A solenoid 852 (FIG. 50A) is provided for disengaging the product matrix gears 577 (FIG. 13) from the product numeral wheels 578, so that the product matrix may be subsequently reset to its initial zero position without rotating the numeral wheels. The solenoid 852 (FIG. 50A) is energized when switches 853 and 854 are closed. Switch 853 (FIG. 26B) was closed when shaft 563 was moved to the position shown during prior engagement of the product matrix with the numeral wheels. Then, when switch 854 is subsequently closed by cam 757 (FIG. 19) at the end of the product scanning operation, the solenoid 852 (FIG. 26A) is energized to disengage the product matrix from the numeral wheels as follows: Energization of solenoid 852 acts though its armature 855 to rock an arm 856 counterclockwise about the shaft 857, to which it is fixed, shaft 857 being suitably supported within the framework of the machine. A cam 858 (FIG. 26) is fixed to shaft 857 and acts through a pin 859 to rock the latch 560 clockwise out of restraining engagement with the transverse shaft 563. Shaft 563 (FIG. 13) overlies the product matrix, which is spring urged by spring 860 to return to its initial raised position. The raising of shaft 563 (FIG. 24) also permits latch lever 590 to return counterclockwise to an enabled position, where it will re-engage with the upper end of lever 593 when the latter is returned to the position shown as described in the next paragraph. Meanwhile, an arm 861 (FIG. 26), also fixed to shaft 857, acts through contact with a pin 862 to rock a latch 863 counterclockwise about a fixed pivot 864, thus removing the restraining surface 865 from engagement with the opposite end of the shaft 563. Latch 863 serves in connection with latch 560 to hold the shaft 563 in its matrix engaging position. Upon release of both of these latches, the matrix is returned to its initial position.

The last two steps of movement of the print-out scanner 750 (FIG. 19) acts through cams 756 and 759 to close switches 770 and 849. Switch 770 (FIG. 50D) is in the circuit of two solenoids SUZ and ZWZ for causing total symbol printing and case shifting of the typewriter carriage; however, the respective circuits of these two solenoids are open at other points and therefore these solenoids are not operated at this time. Switch 849 (FIG. 50A) completes an alternate circuit of the previously described solenoid 380, the energization of which returns the product carriage to its initial leftmost position. The closure of switch 849 also closes the circuit of a solenoid 850 in parallel with solenoid 380. Solenoid 850 withdraws the clutch control dog of a conventional one cycle clutch (not shown), the operation of which clutch causes reciprocation of a link 851 (FIG. 24) first upwardly and then downwardly. Link 851 acts through link 852 and an arm 853 to rock the shaft 594, to which it is fixed, counterclockwise. At such time, the arm 596 (FIG. 13) is rocked counterclockwise and through the transverse bail 597 carried thereby, returns all of the product matrix slides 573 to their respective initial positions, where they are held due to the engagement of the latching surface 592 (FIG. 24) with lever 593. This completes the operation of the machine in entering the price, the amount per unit, and the total price on an invoice. The carriage return key may then be depressed to return the typewriter carriage to its initial rightmost position in preparation for entry of another item, or alternatively, subtotals or totals may now be taken, as described hereinafter.

*Storage Registers*

During the automatic typing out of the product, the solenoids 102 (FIG. 3) are energized in exactly the same manner as if the typewriter keys had been manually depressed, and therefore the product value is entered into the first pin carriage 108. If it is not desired to use this value, the pin carriage 108 may be cleared in this usual manner by depression of the clear key "C" (FIG. 1). Such depression closes a switch C (FIG. 50B) in the circuit of the solenoid 958 and energizes the same to engage a single cycle and cause operation of shaft 100 (FIG. 3). Since neither the multiplier entry solenoid nor the multiplicand entry solenoid is energized at this time, shaft 100 merely acts through cam 210 to reset the pin carriage 108 to its initial cleared condition.

On the other hand, if the "C" key is not depressed, the product value standing in the pin carriage may be subsequently used as a multiplicand value or a multiplier value as previously described, or it may be entered into an accumulator register. For this purpose, the machine is provided with a plurality of registers which may be operated by the differential actuator racks 151 (FIG. 3). Since all of these registers are identical, description of only one will be made, it being noted that the various registers may be located either below or above the toothed racks 151. A storage register framework 600 is shown in FIGS. 3, 30 and 31. Framework 600 is rigidly fixed within the framework of the machine. A similar frame 601 (FIG. 33) is spaced apart from the frame 600 and is also fixed within the framework of the machine, and a register carriage framework is mounted between the two end frames 600, 601, which carriage framework is slidably mounted upon the fixed framework to cause engagement of the register numeral wheel gears with the racks 151. A guide shaft 870 (FIG. 35) is supported by the end frame 600, 601 and which shaft 870 is embraced by a bifurcated tip 871 forming a portion of the sliding framework 603. The left lower end of the sliding frame 603 has an extension 872 standing adjacent bar 873 of the fixed framework 600-601. A plate 874 is suitably fixed to an ear 875 of the sliding frame 603. It will therefore be apparent that the extensions 872 and 874 embrace the fixed ear 873 to aid the transverse guide shaft 870 in guiding the shifting frame 603 upwardly and downwardly.

Two sliding frames 603 are provided, and each has an aperture 613 in which a stud 612 (FIG. 34) is permanently mounted. A plate 610 is fixed on one stud 612, and a plate 611 is fixed on the other stud, the two plates being mounted for rocking motion on the studs. A pair of register shafts 608 and 609 (see also FIG. 49) are suitably mounted in opposite end plates 610, each shaft carrying a plurality of numeral wheels 700 and 701 (FIGS. 36–38), comprising the registers 606 and 605, respectively. The numeral wheel gears 700, 701 of the two registers are engaged with each other to form a conventional type of tumbling register. During actuation of the register, either the register 606 or 605 is engaged with the actuator rack 151, depending upon whether the register is to be driven in a plus or minus direction. FIG. 36 shows the initial position of the parts, register 605 being disposed above and to the left of register 606, the latter being held spaced apart from the actuator rack 151. Assuming that a value is to be entered into the register 606, in a positive direction, then the actuator rack 151 (FIG. 37) is first moved toward the left, as indicated by the broken arrow, under the control of the second pin carriage in the manner previously described. The sliding frame 603 (FIG. 35) is then moved downwardly in a manner to be described, and the numeral wheels 700 are engaged with their respective racks 151 as shown in FIG. 37. The rack is then returned toward its rightmost initial position, as indicated by the full line arrow, and the value standing in the pin carriage is transferred to the register 606. Meanwhile, register 605 is driven by a similar amount, and acts through the following described mechanism to effect tens transfers when necessary.

Tens Carry Mechanism

Each numeral wheel gear 701 (FIG. 36) carries a tens transfer tooth 703 on the side of one of the ten teeth of the gear. Also provided is a tens transfer knockout pawl 706, pivotally mounted at 707 and spring urged in a clockwise position to the extent permitted by engagement of a tail 876 with a transverse bail carried by the sliding framework. The transverse shaft 707, upon which the knockout pawls are pivotally mounted, is also carried by the sliding framework 603 to maintain the relationship shown in FIG. 36 between the knockout pawls, the numeral wheels, and the sliding frame. During positive actuation of the numeral wheels the tooth 703 is rotated in a clockwise direction, and when the numeral wheel passes in a positive direction from a value representative position of 9 to a value representative position of 0, the lug contacts the left side of an extension 705 (FIG. 37) on the knockout pawl 706 and cams the knockout pawl in a counterclockwise direction. At such time, an ear 708 on the pawl rocks a latch 709 clockwise about a shaft 710 carried within the fixed framework 600. This moves an ear 713 on the latch out of restraining engagement with a nose 711 on a tens transfer actuating rack 712. The latter is pivotally mounted on a shaft 714 carried by the fixed frame 600 and is spring urged in a counterclockwise direction by spring 877; at such time the tens transfer actuator rack 712 rocks counterclockwise only a slight amount, and then almost immediately is stopped by contact with a transverse bail 715 carried by the sliding frame 603. In the initial position of the parts as shown in FIG. 36, the transverse bail 715 is located above the extension 719 of the tens transfer rack; however, when the sliding frame 603 is moved downwardly to engage the numeral wheels with the rack as previously described, the transverse bail 715 is also moved downwardly to the position shown in FIG. 37, where it stands opposite the extension 719. Therefore, when the tens transfer rack 712 is released from the latch 713 it rocks slightly counterclockwise and is stopped by the bail 715. Thus, in each order where a tens transfer is to be effected, the racks 712 will be released from their latches 709, but restrained by bail 715. Upon return movement of the numeral wheels to their raised positions and into engagement with racks 712, the bail 715 will be similarly raised up off of the extension 719, thus permitting the tens transfer levers 712 to rock counterclockwise. The arrangement is such that the numeral wheels 701 are brought into engagement with the teeth of the tens transfer actuator rack before the bail 715 is raised out of restraining engagement with the extension 719. Therefore, when the racks 712 are released to the tension of their spring 721, the released racks will impart a one tooth movement to their respective gears 701.

If a numeral wheel stands at a value of 9 when a tens transfer increment is added thereto, thus moving the numeral wheel from 9 to 0 during the tens transfer operation, then the knockout pawl 706 (FIG. 36) is rocked counterclockwise in the manner previously described to unlatch the actuator 712. At this time, however, the restraining bail 715 will have been returned to its initial raised position where it is out of restraining engagement with the extension 719, and therefore the springs 877 are permitted to advance the associated rack 712 immediately upon unlatching thereof.

During problems of subtraction the two registers are tumbled as described hereinafter so that the numeral wheels 701 are engaged with the rack 151. In this case, the numeral wheel lug 702 on the numeral wheel 700 cooperates with the extension 705a, of the knockout pawl, and during rotation of numeral wheel 700 in a minus direction from a value of 0 to a value of 9 the knockout pawl is operated in conventional manner.

The tens carry knockout pawls 706 are restored from their tripped position by the following mechanism. A shaft 500 (FIG. 35) is reciprocated in a counterclockwise direction and then back to the initial position shown once for each storage register value entering operation, as described hereinafter. During the counterclockwise movement a cam 656 fixed to the shaft 500 and carrying a pin 723 moves the pin from position 723a (FIG. 41) to position 723b, and finally to position 723c. A lever 724, pivotally mounted at 718, is adapted for cooperation with the pin 723. The pivot 718 is carried on a restore bellcrank 881, which is pivotally mounted at 714 to the framework of the machine. A spring is connected between the lever 724 and bellcrank 881, which spring urges lever 724 in a clockwise direction to follow the movement of the pin 723. Thus, when pin 723 rocks clockwise, lever 724 also rocks clockwise, and when the position 723b is reached, the pin lies on a shoulder 725 of lever 724. The further movement of pin 723 from position 723b to 723c forces lever 724 downwardly, thus rocking the pivot point 718 and the bellcrank 881 clockwise about the pivot 714. At such time a transverse bail 882 rocks all of the released latches 711 counterclockwise from the full line position shown in FIG. 38 to the dotted line position, whereupon the ears 713 act in response to their respective spring 721 and move underneath the noses 711 of the tens carry actuator racks, thus restoring the latches 709 and the knockout pawls 706 to the initial position shown. The return of the pin 723 (FIG. 35) to its initial position 723a moves the tens carry restore mechanism back to its initial position.

The tumbling registers are reset to 0 by rotating the numeral wheels 700 and 701 in a subtractive direction, thus bringing the lug 702 against the rightmost face of the tooth 705a. This exerts a force in a line substantially to the center of shaft 707 and therefore the pawl 706 cannot be forced to rock. With the lug 702 standing adjacent the rightmost face of tooth 705a the numeral wheels of both registers will stand at 0 position, after which the numeral wheels are disengaged from the rack 151 and returned to their initial positions.

Register Tumbling Mechanism

The tumbling of the registers from a plus to a minus actuating position or vice versa is effected by a pair of cam plates 620, 621 (FIGS. 33 and 34), pivotally mounted upon a transverse shaft 623 carried by the sliding frame 603 (FIG. 35). Each cam plate has a rocking tooth 628 (FIG. 33) and a pair of locking teeth 627, 626. When cam plates 620, 621 are rocked counterclockwise to the position shown in FIG. 33, the rocking tooth 628 contacts a stud 619 carried by plate 610 and rocks the latter clockwise to the plus position shown. At such time the rocking tooth 626 contacts a stud 618 on plate 610 and aids in holding the plate in the position shown.

If minus actuation of the numeral wheels is to occur, then the cam plates 620, 621 are rocked clockwise to the position shown in FIG. 34, at which time the rocking tooth 628 contacts stud 618 and rocks plate 610 counterclockwise to its minus position, and in which position it is locked by contact of tooth 627 with stud 619. Cam plates 620, 621 each have a respective stud 655 engaged by the bifurcated tip of an actuating lever 625. The latter is pivotally mounted at 652 upon a lever 650 which in turn is pivotally mounted at 635 to the fixed frame 601. A spring 878 constantly urges lever 650 counterclockwise to the initial position shown, where an upper surface 653 of the lever is in engagement with a roller carried by an arm 651 fixed to a shaft 500. Shaft 500 is reciprocated counterclockwise and then back clockwise to the position shown at differential times during the machine operation, depending upon whether a value is to be entered into the register, such as during a plus or minus operation, or taken out of the register, such as during a total operation, all as is fully described hereinafter. When shaft 500 and arm 651 are rocked counterclockwise, lever 653 is rocked counterclockwise from the position shown in FIG. 33 to that shown in FIG. 34, thus moving lever 625 downwardly. The latter carries a pair of forwardly projecting ears 653 and 654, which cooperate with the upper surface 607a of a tumbling control lever 607. With the parts in the position shown in FIG. 33, the downward movement of lever 625 will bring ear 653 down on top of the surface 607a and if the latter stands in the counterclockwise position shown in FIG. 34, lever 607 will block the ear 653 and thus rock the lever 625 in a clockwise direction about its pivot 652. At such time, the bifurcated tip acts through stud 655 to rock the plate 621 in a counterclockwise direction and adjust the tumbling registers for positive actuation. If the lever 607 underlies ear 654 when lever 625 is moved downwardly, then the latter is rocked counterclockwise to the position shown in FIG. 34 to adjust the registers for negative actuation.

The tumbling control lever 607 is pivotally mounted on a fixed stud 629 (FIG. 30) and is urged counterclockwise (by a spring not shown) to the position shown in FIG. 30 against a pin 642. The latter is carried by a lever 640 which is pivotally mounted at 639 to an arm 638. The latter is integral with a lever 636 which is pivotally mounted to the framework of the machine at 637. It is therefore apparent that the location of the pivot 639 for arm 640 can be changed by manipulation of the lever 636. Also, the lever 640 may be controlled for rocking movement about its pivot 639 by means of a pin 644 (FIG. 31) which lies within a slot cut in the rightmost end of lever 640. Pin 644 is carried by lever 632, which is pivotally mounted at 635 to the framework of the machine.

Assuming for our purposes of illustration that the lever 632 stands rocked in the counterclockwise position shown in FIGS. 31 and 32, then any movement of the lever 636 about its pivot 646 will cause the pivot 639 for lever 640 to be rocked clockwise from a position shown in FIG. 28 to that shown in FIG. 29. At such time pin 642 on lever 640 will act upon the cam surface 649 of lever 607 and rock the latter clockwise about its pivot 629. This moves the blocking surface 607a clockwise to the position shown in FIG. 34, where it underlies the ear 654 of the previously described lever 625. In this position of the parts, the clockwise rocking of the lever 650 moves lever 625 downwardly, and since ear 654 is blocked, causes the counterclockwise rocking movement of lever 625 about its pivot 652. This moves pin 655 of the tumbling control cam 620 in a clockwise direction and moves the registers to the minus position previously described.

The plus minus lever 636 normally stands in the position shown in FIG. 30, but may be moved to the minus position shown in FIG. 32 under the control of a solenoid 880 (FIG. 50D) by conventional connections (not shown). Depression of a minus typewriter key closes a switch 879 thus closing the circuit of solenoid 880 and rocking the lever 636 to a minus position for the purposes previously described. Lever 636 is held locked in the minus position by a conventional latch, not shown, and which latch is moved to release the lever near the end of the cycle of rotation of the main shaft 100.

In the above example, lever 632 is held fixed in the position shown in FIGS. 31 and 32, while lever 636 was rocked from plus to minus position, and for purposes of the present invention it may be assumed that lever 632 is blocked in the position shown in FIG. 31; however, under certain conditions not described herein, lever 632 is rocked clockwise to the position shown in FIG. 30, which moves the pin 644 clockwise to a position in which the rocking movement of lever 636 and its integral pivot point 639 will merely move the lever 641 endwise in a direction parallel to the slot in the end of the lever. Thus, pin 642 merely moves away from and beyond the cam control surface of lever 607, and does not exert any control thereover.

The previous mechanism has been concerned with the tumbling of the registers to plus or minus actuating position, and it will be understood that such tumbling must occur before the selected register is moved downwardly into engagement with the rack 151. For this reason it will be noted that the roller 882 (FIG. 34) carried by arm 651 begins to rock the lever 650 and properly tumble the registers almost immediately after shaft 500 is started in its rocking movement. Therefore, early in the reciprocation of the shaft 500 the registers will be properly tumbled to plus or minus position, as the case may be. After the registers are properly tumbled, the sliding frame 603 (FIG. 35) is moved downwardly under the control of a cam 656 fixed on shaft 500 to cause proper engagement of a selected register with racks 151. Cam 656 comprises two opposed cam surfaces 657 and 661, carried by integral arms 656 and 656a. These two cam surfaces cooperate with a roller 659 carried by an extension of the sliding frame 603. When shaft 500 is first rocked, the cam surface 657 approaches the roller 659, during which approaching movement the registers are tumbled, as previously described. Then, upon contact of surface 657 with roller 659 the sliding frame 603 is moved downwardly to engage a selected register 605 or 606 (FIG. 33) with the rack 151. Surface 660 (FIG. 35) on cam 656 locks the roller and the sliding frame in its lowermost position. Shaft 500 is held in its counterclockwise rocked position for a predetermined length of time during which a plus, minus, total, or subtotal operation is carried out, as described hereinafter, and then the cam 656 is returned to the initial position shown, at which time the leading cam surface 658 picks up roller 659 and returns the sliding frame 603 to its initial raised position, where it is held by the cam surface 661.

Shaft 500 (FIG. 46) is reciprocated at differential times by means of a reciprocating shaft 501, which is connected and disconnected to shaft 500 under the control of a plurality of solenoids shown in FIGS. 27–29. Shaft 501 is driven in its reciprocating movement by shaft 100 through the medium of a conventional cam (not shown). Shaft 501 is reciprocated first in a clockwise direction and then a counterclockwise direction once for each entry to be made in one of the accumulator registers described above. A rack segment 883 having teeth 884 is fixed to shaft 501 and meshes with a rack segment 521 pivotally mounted upon a fixed shaft 502. A pair of drive pins 520 and 529 are fixed to rack segment 521 and cooperate with shoulders 519 and 518, respectively, of a pusher link 885.

In the initial position of the parts shown in FIG. 46, pins 520 and 529 lie out of the path of the shoulders 519 and 518; however, as described hereinafter, the pusher link 885 is rocked either up or down under the control of solenoids described hereinafter to permit the pins 520 and 529 to act at differential times upon pusher link 885 and move the same towards the right and back to the position shown. Link 885 is pivotally mounted at 522 to a lever 523, the latter being pivotally mounted upon a fixed shaft 503. A link 524, which is substantially parallel to link 885 is also pivotally mounted to the lever 523. The leftmost end of link 524 is pivotally connected to an arm 525 fixed to the previously mentioned shaft 500. It will therefore be apparent that if the pusher link 885 is moved toward the right, link 524 will partake of a similar movement, thus rocking shaft 500 in a counterclockwise direction. When the motive force supplied by either of the pins 520 or 529 is removed from link 885, a spring urged bail 426 is released from a detent (not shown) and returns the articulated linkage described above back to its original position. From the above description, it will therefore be apparent that shaft 500 is reciprocated at different times, depending upon the position of pusher link 885 with respect to the two pins 520 and 529.

The position of the parts during a plus or minus value entering operation is shown in FIG. 47. Early in the cycle of operation, the pusher link 885 is rocked counterclockwise by means described shortly hereinafter, to a position in which surface 886 rests on pin 520. Then, when rack segment 883 is rocked clockwise, the pin 520 moves under the tooth 519 and under surface 887 of the pusher link 885. It will be observed that this idle movement of pin 520 from the position shown in FIG. 46 to that shown in FIG. 47 does not impart any rightward movement to the pusher link nor to the lever 523. Upon return movement of the rack segment 883, the segment 521 is rocked in a clockwise direction, at which time the pin 520 acts upon tooth 519 to move the pusher link 885 towards the right, thus rocking the shaft 500 counterclockwise to the dotted line position shown in FIG. 47. Such rocking movement engages the register numeral wheels 700 or 701 (FIG. 36) with the racks 151 as previously described, and entry of a value into the register occurs upon movement of the racks to their initial positions. After such entry is completed, shaft 500 (FIG. 47) is permitted to return to the initial position shown merely by rocking pusher 885 clockwise to the extent that tooth 579 is removed from engagement with pin 520. The same mechanism which rocks the pusher link 885 also releases a spring urged bail 426 to return the lever 523 and the link 885 to their initial positions.

The rocking movement of pusher link 885 is controlled in the following manner: If a plus or minus operation is to be performed, the solenoid 401 (FIG. 27) is energized, and a latch enabling solenoid 404 is also energized to move an operation conditioning link 400 to the position 400b (FIG. 29), shown in dotted lines. In FIG. 28 both solenoids are shown as energized, solenoid 401 moving lever 413 clockwise about fixed pivot 410 and through impingement of surface 414 on the lever with a web 415, it rocks a lever 416 clockwise about the pivot 410 to the position shown. At the same time, solenoid 404 is also energized, as shown, thus pulling link 427 towards the left, and through lever 428 moving link 406 toward the right. This moves a pin 429 toward the right and permits spring 421 to pull latch 420 into engagement with a stud 418 on the lever 416. Meanwhile, the upper end of lever 426 is rocked clockwise by the armature of solenoid 404 to the extent that a detent pin 431 on the spring urged lever 432 falls behind an appropriate shoulder on lever 426 and holds the linkage described in position to lock stud 418, as shown. The leftward movement of link 400 (FIG. 46) to the dotted line position 400b acts through a pin and slot connection 514, 515 to rock a lever 513 (FIG. 48) slightly counterclockwise from the position shown in FIG. 46 to that shown in FIG. 47. An ear 511 on a lever 508, pivotally mounted at 506, resides within an irregularly shaped aperture formed in the upper end of lever 513. In the initial position of the parts, ear 511 is constrained between opposed shoulders 527 and 891.

The leftmost end of lever 508 has an arcuate slot 516 cut therein, which slot embraces a pin 517 carried by the pusher link 885. A ball 509, urged upwardly by a spring 507 tends to rock the lever 508 in a clockwise direction, but is prevented from doing so by a shoulder 527. Furthermore, even though the lever 513 is rocked counterclockwise to the position shown in FIG. 47, the spring 507 and ball 509 (still assumed to be standing in the position shown in FIG. 46) cannot rock lever 508 clockwise, since the ear 511, shown in position 511a, is blocked by shoulder 527. Thus, during the clockwise rocking movement of the rack segment 883, the pusher link 885 will be held in the position shown in FIG. 46, where both shoulders 518 and 519 are held out of the paths of their respective pins 529 and 520.

During the clockwise movement of the rack segment 883, the shaft 507 is rocked clockwise from the position shown in FIG. 46 to that shown in FIG. 47, thus rocking a carrier 510 for the spring 507 and ball 509 in a similar clockwise direction. The ball 509 therefore exerts a pressure on the lever 508 in a direction tending to rock the latter in a counterclockwise direction. Since ear 511 on lever 508 is not blocked from counterclockwise movement, it rocks to the full line position shown in FIG. 47. At such time, the pin and slot connection 516, 517 rocks the pusher link 885 counterclockwise about the pivot 522. This moves surface 886, as previously described, down onto the pin 520 and subsequently permits the tooth 519 to slide over the pin 520 to the position shown in FIG. 47. A rack segment 883 is then returned counterclockwise to its initial position, during which movement the pin 520 picks up the tooth 519, thus moving the pusher link 885 toward the right, as previously described to rock the shaft 500 counterclockwise, thus causing register tumbling and engagement with the actuator racks in the manner fully described.

Near the end of the return clockwise movement of rack segment 521 to initial position, pin 529 (FIG. 46) acts through cam surface 892 to lift the pusher link 885 off of stud 520, thus breaking the connection 520–519 and permitting the shaft 500 to return to its initial position. Meanwhile, shaft 507 is returned to its initial position, at which time the ball 509 acts upon the left arm of lever 508 and aids in returning the pusher link 885 to its initial position. The foregoing example applies equally well to a subtract operation, except that in this case, the subtract key has been pressed to energize the subtract solenoid, as previously described, to cause appropriate tumbling of the register prior to the engagement of the register with the actuator racks. Therefore, it will be clear that the solenoid 401 and the solenoid 404 are energized during both plus and minus operations with respect to the accumulator register.

Energization of the solenoid 403 (FIG. 27) rocks a detent lever 426 counterclockwise back to its initial position and acts through the articulated linkage 427, 428, 406 and pin 429 to disable the latch 420 with respect to the pin 418, at which time all of the parts return to their initial positions.

A totaling operation is carried out in a very similar fashion, except that the solenoid 402 (FIG. 29) is energized instead of the solenoid 401, and, of course, the solenoid 404 is energized to enable the latch in the previously described manner. Solenoid 402 rocks lever 433 clockwise, and since the face 893 thereof lies more closely adjacent to web 415 than does the face 414 of lever 413, the rocking of lever 433 will therefore impart a greater extent of movement to the lever 416, thus rocking the pin 418 downwardly to the extent that it is locked by the lowermost notch in the latch lever 420. Also, arm 435 of lever 433 rocks lever 423 counterclockwise to remove a blocking shoulder 894 from the path of the pin 418, and to move a shoulder 436 into the path of the pin 418.

Meanwhile, the clockwise movement of lever 416 moves link 400 to the position 400c as shown in FIGS. 29 and 48. This rocks lever 513 (FIG. 48) one increment counterclockwise from that shown in FIG. 47, so that the shoulder 527 is removed from beneath the ear 511 on lever 508. Therefore, the ball 509, which at this time is at the position shown in FIG. 48, rocks lever 508 clockwise and through the pin and slot 516, 517 rocks the pusher link 885 clockwise to the extent permitted by contact of extension 896 with pin 529. Pin 529 is therefore in position to pick up shoulder 518 and rock the pusher link towards the right during the counterclockwise movement of the rack segment. The timing of the parts is such that the selected register is tumbled and engaged with racks 151 before the actuator racks 151 (FIG. 3) are released. In a fashion analogous of other arrangements, a magnet-actuated linkage lifts now, and holds a shelf 299 (FIG. 4) which communicates correspondingly with lever 151 and prevents the toe 158 from engaging arm 159, thus preventing actuation of the rising pin carriage. Therefore, when the racks 151 (FIG. 36) are moved toward the left, they will travel below the empty pin carriage (FIG. 3), and the numeral wheels will be rotated in a subtractive direction to the extent permitted by the lugs 703 on the numeral wheels 701, coming into contact with the shoulder 705 of the previously described knockout pawls. Thus, at the end of the leftward movement of the racks, the numeral wheels of register 605 will stand at 0 positions, and the racks 151 will stand at differential positions representative of the values which previously stood in the numeral wheels, as is usual in total taking operations. The positions of the racks may subsequently be read out through the matrix 223 and the total typed out on the involve as described below.

Referring now to the circuitry for controlling a total operation, a switch 901 (FIG. 50C) is closed by the escapement of the typewriter carriage into selected columns of the invoice, where a total operation is permissible. Then, upon depression of the total key, a switch 902 is closed, thus completing a circuit from lead 300 (FIG. 50A) through switch 60, lead 547, switch 548, lead 549, lead 942 (FIG. 50C) switches 901, 902 to ground. The energization of SU operates a plurality of switches as follows: Switch SU1 in the circuit of solenoid SU is closed and acts as a holding circuit for this solenoid to maintain it in its energized condition. Switch SU2 (FIG. 50A) in the circuit of the pin carriage solenoid 109 is opened, so that as the values are typed out by the typewriter they are not entered into the pin carriage. The switch SU3 is closed to throw the previously described solenoid 404 (see also FIG. 28) into series with one of the solenoids 402, 904, and 905, one of which is energized, as described below, upon selection of a respective register for totalizing. The switch SU4 (FIG. 50B) in the circuit of the multiplier solenoids 320 to 329 is opened and the switch SU5 (FIG. 50D) is closed to condition the circuit of a solenoid SUZ, so that when a switch 770 is subsequently closed during a scanning operation, the total symbol will be printed after the total value is typed out. Since solenoids 404 and 402 (FIG. 28), for example, are energized to read a total, link 430 is moved to the right as shown and switch 946 (FIG. 50B) is closed.

This completes a circuit from lead 300, switch 946, lead 944 (FIG. 50A), switch UV₂, leads 950, 951 to relay ZA (FIG. 50C). The energization of relay ZA closes switch ZA₁, (FIG. 50A), thus completing the circuit of the previously described solenoid 222 the energization of which engages the single cycle clutch and a single cycle of operation of the main operator shaft 100 (FIG. 3) ensues. Meanwhile, one of the switches 907, 908, or 909 will have been closed by the program control mechanism associated with the typewriter platen, thus completing a circuit from the lead 549 (FIG. 50A), one of the switches 907, 908, 909, a selected solenoid 402, 904, 905 (402 in the present case) to the now closed switch SU3, through the winding of solenoid 404 and through the two normally closed switches RZ to ground. The energization of solenoid 402, for example, and 404 (FIG. 28) conditions the machine for a total taking operation, as previously described, and which total taking is carried out under the control of the solenoid 222 (FIG. 14) all as has been previously described.

The racks 151 are thus set to differential positions under the control of the values standing in the selected register, and such values are transferred to the multiplier matrix 223 (FIGS. 9 and 50B). In the present case, the value standing in the multiplier matrix will be typed out, rather than used for the also possible control of a multiplying operation. During the total entry operation, switch 249 (FIGS. 14 and 50A) is closed. This completes a circuit from the main line 300 through solenoid KMA and the switch SU7 (now closed) to ground. Solenoid KMA (FIG. 19) is identical in function to the solenoid 740, which, as previously described, operates the print-out scanner 750. At the present time, however, the switch MU₂ (FIG. 50B) is open, thus disabling the scanner with respect to the multiplier solenoids, and instead, a circuit is completed from a main branch lead 301 (at bottom of FIG. 50B) through the switches 779 and 780 closed by the scanning switch, as previously described, through lead 786 of a selected one of the typewriter solenoids 800 through 809, through one of the branch leads 920 to 929, through one of the contacts 237–0 to 237–9, depending upon the value of the value to be read out, and through the first print-out lead 371, the closed scanner switch 931, the normally closed switch 940 and lead 774 to ground. In this manner, the first digit of the total is printed out, followed by printing of the remaining total values as the scanner switch progresses and closes the switches 931 through 938. During such print out the decimal switch switch 767' (FIG. 50D) is closed to cause printing of the decimal point in its appropriate position, as previously described in connection with printing of the decimal in multiplication operations, there being two switches 767 and 767' for cooperation with the multiplier and total scanning mechanisms respectively.

The scanner switches 770 (FIG. 50D), 771 (FIG. 50C) and 849 (FIG. 50A) are also closed in sequence following the print-out operation. Switch 770 completes a circut through the SUZ, or total printing symbol solenoid. Switch 771 opens the locking circuit of relay SU. Switch 849 completes a circuit through the solenoid 380, which, as previously described, normally causes return shift of the product carriage to its endmost left position at the termination of multiplication; however in the present case, this is an idle operation.

A subtotal operation is performed in two cycles of operation of the shaft 100 (FIG. 3). During the first cycle the value standing in any selected accumulator register is totaled out in the same manner as described above with the exception that as the total value is typed out, it is re-entered into the pin carriage. Then, during the second cycle of operation of the main shaft 100 the value standing in the pin carriage is either re-entered into the same register from which the total value was extracted, or, selectively, is entered into another one of the accumulator registers. Since a subtotal operation cannot be performed unless the total value is re-entered into the pin carriage, it will be apparent that subtotaling operations can be prevented merely by preventing the re-entry of a total value into the pin carriage. Advantage is taken of this fact in that the programming of the machine may be so conditioned that a total and subtotal operations are always permissible when the typewriter carriage stands in a typing position relative to the rightmost invoice column where, with respect to the invoice shown in FIG. 3, total and subtotal operations may be performed. With the carriage standing in this position, the depression of the total key causes a total operation, as previously described, but prevents re-entry of the total value into the pin carriage. Therefore, an automatic subtotal operation is prevented. If a subtotal key is depressed, however, an automatic totaling operation is carried out with re-entry into the pin carriage, and therefore the subtotaling operation is automatically carried out.

Referring now to FIG. 50C, the depression of the subtotal key closes a switch 941, thus completing a circuit of the subtotal relay ZW, since the switch 901 was closed by the programming mechanism when the typewriter carriage entered the total or subtotal column. Starting with ground, the circuit is closed through the relay ZW, switch 941, switch 901, lead 942 (FIG. 50A), lead 943, lead 549, switch 548, lead 547, and switch 60, now closed, to the main lead 300. Energization of relay ZW closes switch ZW1 (FIG. 50C) thus completing a holding circuit through switch 771 to the lead 301. The closure of a switch ZW2 (FIG. 50A) by relay ZW completes a circuit including lead 549 through one of the switches 907, 908, and 909, which has been selected by means of the programming mechanism for a readout of a selected register, through the winding of a respective solenoid 905, 904, or 402 to the common lead 944, through closed switch ZW2, the solenoid 404 (see also FIG. 8), the normally closed switches RZ and the normally closed switch 945 to ground. Thus, one of the register totalizing solenoids 402, 904, or 905 is energized and the register engaging mechanism is latched in engaged position, as previously described. Meanwhile, a switch 946 (FIG. 50B) is closed by the selection of one of the accumulator registers for totalizing as previously described; thus, completing a circuit from the main lead 300 through the branch lead 948, the switch 946, lead 944, the normally closed switch UV₂ (FIG. 50A), lead 950, lead 951 (FIG. 50C) through the relay winding ZA. The energization of relay ZA closes switch ZA1, thus completing a circuit from the lead 533 through switch ZA1 and the total entry solenoid 222 to ground.

Referring to FIG. 14 it will be recalled that energization of solenoid 222 causes single cycle of operation of the main operator shaft 100, and through the previous energization of solenoid 402, 904, or 905 together with the energization of solenoid 404 prepares the machine for entry of the total value into the actuator racks 151, and therefrom into the readout marix 223, in the manner previously described. Since the totalizer key has not been depressed, the relay winding SU (FIG. 50C) is not energized, and therefore the switch SU2 remains closed, so that during printing of the total value the total value will be entered into the pin carriage. Meanwhile, the previous energization of relay ZW has closed the switch ZW3, thus partially completing the circuit of solenoid KMA, and upon subsequent entry of the total into the multiplier matrix which now serves as a product readout matrix, the switch 249 (FIG. 14) is closed, as previously described, thus completing the circuit of the solenoid KMA. The energization of solenoid KMA operates the scanning device 750 (FIG. 19) to cause typeout of the subtotal (total) value in the manner previously described.

During subtotaling operations the scanning switch 770 (FIG. 30) is closed in the usual manner after the total readout operation to complete a circuit from the lead 301 and switch ZW6, which is closed by the previous energization of solenoid ZW. This energizes solenoid ZWZ to operate the case shift mechanism for the typewriter carriage at the same time that solenoid ZWZ closes switch ZWZ1 in the circuit of the minus key solenoid MIZ. Referring to FIG. 1, the depression of the minus key with the case shift mechanism in operation causes printing of the subtotal symbol at the end of the subtotal amount in the appropriate column of the invoice.

The printing of the first digit of the total and the subsequent entry of this digital value into the pin carriage closes a switch 64 (FIGS. 12 and 50D) which energizes the relay UV. Switch UV1 (FIG. 50A) is thus closed since one of the switches 954 will previously have been closed by the program control mechanism during shifting of the typewriter carriage into the total prining column, a circuit is closed through a selected one of the solenoids, such as solenoid 401, for example, the circuit starting at 549, switch 954, solenoid 401, the normally closed switch SU6, the switch UV1 (now closed), through lead 955 to solenoid 404, and to the normally closed switches RZ and 945 to ground. This energizes solenoids 401 and 404 (FIG. 48), to condition the machine for re-entry of the total value into a selected one of the accumulator registers, as previously described. Meanwhile, the relay UV closes a switch UV3 (FIG. 50B), thus completing a circuit from the main lead 300, lead 948, switch 946 (now closed, as previously described), switch UV3 (now closed). From the switch UV3 the circuit continues through lead 957 to a solenoid 958 to ground. The energization of solenoid 958 causes a single cycle of operation of the clutch which reciprocates the actuator racks 151 (FIG. 3) in the manner previously described. When racks 151 are reciprocated, the value standing in the first pin carriage has already been transferred into the second pin carriage and the racks 151 are reciprocated to enter the value into the selected storage register. During such reciprocation of the rack 151, neither the multiplier (solenoid 222) nor multiplicand (solenoid 124) entry mechanism is enabled, and therefore entry of such value into the storage mechanisms is not permitted. During the transfer of the totaled value (in both totaling and subtotaling operations) a switch 958 (FIG. 50A) is closed, thus completing a circuit from the main lead 300 through lead 523 to the resetting solenoid 403 (FIG. 27) to thereby release the latch 420 and restore the conditioning mechanism for the register engaging controls to initial disabled position. This completes the operation of the machine in subtotaling operations, at the end of which the subtotal is printed in the proper column of the invoice and the subtotal value is either re-entered into the register from which it was originally extracted, or it is entered into a selected accumulator register.

It will be observed that if a totaled or subtotaled value is to be subsequently used as a multiplier factor or multiplicand factor, then the machine may be programed to energize either the multiplicand entry solenoid 124 or the multiplier entry solenoid 222 (FIG. 50A) respectively, instead of solenoid 958 which merely cycles shaft 100. It will further be observed that if the total or subtotal value being entered as a multiplicand or as a multiplier is also to be stored in one of the accumulator registers, then such storing may be accomplished simultaneously with the entry of the total or subtotal value into the multiplier or multiplicand factor mechanism merely by energizing the solenoids 401 and 404 (FIG. 28) prior to the energization of solenoid 124 or 222. In the latter case, the product of $A \times B$ may be re-entered as the next multiplicand or multiplier factor and simultaneously stored for use as a constant. Then, the product AB may be multiplied by C after the value C is entered either by means of the typewriter or from one of the storage registers. Thus, progressive multiplications may be carried out and/or one or more of the products may be stored as a constant; furthermore, selected products may be accumulated and later read out as totals or subtotals, as required.

Since the readout mechanism is provided with means for automatically aligning the decimal of a product value with the decimal in the readout mechanism, each product will be read out to the same number of decimal places; and therefore, these products may be easily automatically accumulated. Furthermore, progressive multiplication operations such as $A \times B \times C$, etc. may be carried out without requiring attention on the part of the operator as to the location of the decimal points in the products, since the products and their decimals are automatically aligned with the readout mechanism prior to the typing of the product or to the re-entry of the same as a subsequent factor in the multiplying operation.

From the foregoing, then, it is seen that the automatic decimal aligning mechanism relieves the operator from all previously known entry problems, such as pumping in zeros before or after the decimal, and furthermore, permits chain operation to be carried out without any particular attention on the part of the operator other than to enter the various factors and then observe the machine automatically type out the results.

I claim:

1. A combined calculator and typewriter comprising a plural order numeral wheel register for recording the result of a calculation, numeral wheel actuating mechanism, and a value entry mechanism operable by the typewriter keys for controlling the actuating mechanism, a carriage on the typewriter, means for reading out the value standing in said register, mechanism for ordinally shifting the register and the read-out means relative to each other, means operable prior to a read-out operation and under control of the value entry mechanism for determining the number of orders of operation of the shifting mechanism, and means carried by the typewriter carriage and operable in predetermined positions of the carriage to condition the stepping mechanism for operation by the value entry mechanism.

2. A calculator comprising a plural order numeral wheel register for recording the result of a calculation, numeral wheel actuating mechanism, and a value entry mechanism for controlling the actuating mechanism, means for reading out the value standing in said register, mechanism for ordinally shifting the register and the read-out means relative to each other, means operable prior to a read-out operation and under control of the value entry mechanism for determining the number of orders of operation of the shifting mechanism, a typewriter, means controlled by the typewriter for causing the value entry mechanism to enter integral and fractional digits in said factor receiving device, a stepping mechanism responsive to the operation of the value entry mechanism in entering fractional digits, mechanism operable under the control of the stepping mechanism to shift the result register relative to the read-out mechanism, and means carried by the typewriter carriage and operable in predetermined positions of the carriage to condition the stepping mechanism for operation by the value entry mechanism.

3. A combined typewriter and calculator as defined in claim 2 in which the partial electrical circuit is closed only in predetermined shifted positions of the typewriter carriage.

4. A combined typewriter and calculator as defined in claim 2 in which the depression of a typewriter key completes the circuit for the stepping mechanism.

5. A calculator comprising a plural order numeral wheel register for recording the result of a calculation, numeral wheel actuating mechanism, a value entry mechanism for controlling the actuating mechanism, means for reading out the value standing in said register, means for shifting the register relative to the read-out means, said shifting means being enabled upon conclusion of the calculation and the registration of a result in said register, said read-out mechanism comprising a plurality of orders of digital members including a predetermined number of integral representative members, a predetermined number of fractional representative members, and a decimal point print out control means, means selectively operable during a value entry operation for signifying the entry of fractional digits, and means operable under control of said selectively operable means for aligning the first fractional digits of the read-out mechanism and register, respectively, to locate the decimal print out control means relative to the decimal value generated in the register.

6. A combined typewriter and calculator comprising a plural order numeral wheel register for recording the result of a calculation, numeral wheel actuating mechanism, a factor receiving device, a value entry mechanism controlled by the typewriter for causing the value entry mechanism to enter integral and fractional digits in said factor receiving device, a stepping mechanism responsive to the operation of the value entry mechanism in entering fractional digits, mechanism operable under the control of the stepping mechanism to shift the result register relative to the read-out mechanism, means operable under control of the read-out mechanism for actuating the typewriter in correspondence with a value standing in said calculator register, a key for initiating the operation of the typewriter shifting mechanism, and means operable jointly by completion of a typewriter carriage shift operation and by release of the shift key for initiating the read-out operation of the typewriter.

References Cited in the file of this patent

UNITED STATES PATENTS

| | | |
|---|---|---|
| 1,218,255 | Hardgrave | Mar. 6, 1917 |
| 1,908,986 | Kottman | May 16, 1933 |
| 2,702,159 | Reppert | Feb. 15, 1955 |
| 2,707,076 | Sharpe | Apr. 26, 1955 |
| 2,771,224 | Von Waldbergen | Nov. 20, 1956 |
| 2,842,310 | Matthew | July 8, 1958 |
| 2,864,554 | Rolph | Dec. 16, 1958 |
| 2,896,846 | Dustin | July 28, 1959 |
| 2,917,232 | Wagemann | Dec. 15, 1959 |
| 2,935,250 | Reppert | May 3, 1960 |
| 2,987,246 | Wagemann | June 6, 1961 |

FOREIGN PATENTS

| | | |
|---|---|---|
| 564,394 | Italy | July 14, 1957 |
| 565,041 | Italy | July 8, 1957 |